(12) United States Patent
Omori

(10) Patent No.: US 9,970,479 B2
(45) Date of Patent: May 15, 2018

(54) THRUST BEARING

(71) Applicant: IHI Corporation, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 74 days.

(21) Appl. No.: 15/209,869

(22) Filed: Jul. 14, 2016

(65) Prior Publication Data

US 2016/0319859 A1 Nov. 3, 2016

Related U.S. Application Data

(63) Continuation of application No. PCT/JP2015/052317, filed on Jan. 28, 2015.

(30) Foreign Application Priority Data

Jan. 30, 2014 (JP) .................................. 2014-015684
Oct. 3, 2014 (JP) .................................. 2014-205054

(51) Int. Cl.
| | |
|---|---|
| *F16C 32/06* | (2006.01) |
| *F16C 17/04* | (2006.01) |
| *F16C 27/02* | (2006.01) |
| *F16C 33/04* | (2006.01) |

(52) U.S. Cl.
CPC .............. *F16C 17/042* (2013.01); *F16C 27/02* (2013.01); *F16C 33/046* (2013.01); *F16C 2360/00* (2013.01)

(58) Field of Classification Search
CPC .................................................. F16C 17/042
See application file for complete search history.

(56) References Cited

U.S. PATENT DOCUMENTS

| | | | | |
|---|---|---|---|---|
| 4,082,375 A | | 4/1978 | Fortmann | |
| 4,208,076 A | * | 6/1980 | Gray | F16C 17/024 384/105 |
| 4,227,752 A | * | 10/1980 | Wilcock | F16C 17/042 384/106 |
| 4,296,976 A | * | 10/1981 | Heshmat | F16C 17/024 384/309 |
| 4,462,700 A | * | 7/1984 | Agrawal | F16C 17/042 384/105 |

(Continued)

FOREIGN PATENT DOCUMENTS

| | | |
|---|---|---|
| CN | 103291745 A | 9/2013 |
| JP | S61-038324 U | 3/1986 |

(Continued)

OTHER PUBLICATIONS

International Search Report received for PCT Patent Application No. PCT/JP2015/052317 dated Apr. 28, 2015, 4 pages (2 pages of English translation and 2 pages of original PCT search report).

*Primary Examiner* — Phillip A Johnson

(57) ABSTRACT

A thrust bearing disposed facing a thrust collar provided on a rotary shaft, the thrust bearing includes: a top foil disposed facing the thrust collar; a back foil disposed on a side of the top foil opposite to another side of the top foil facing the thrust collar; and an annular plate-shaped base plate supporting the back foil. The back foil is formed of a plurality of back foil pieces. The top foil is formed of a plurality of top foil pieces. A vibration-damping foil piece is disposed in each of the positions between the back foil pieces and the top foil pieces.

16 Claims, 15 Drawing Sheets

(56) References Cited

U.S. PATENT DOCUMENTS

| | | | |
|---|---|---|---|
| 4,597,677 A | | 7/1986 | Hagiwara |
| 5,318,366 A | * | 6/1994 | Nadjafi .................. F16C 27/02 384/105 |
| 5,833,369 A | | 11/1998 | Heshmat |

FOREIGN PATENT DOCUMENTS

| | | |
|---|---|---|
| JP | S61-092316 A | 5/1986 |
| JP | S63-195412 A | 8/1988 |
| JP | H10-331847 A | 12/1998 |
| JP | 2003-148461 A | 5/2003 |
| JP | 2005-155802 A | 6/2005 |
| JP | 2008-513701 A | 5/2008 |
| JP | 2009-185857 A | 8/2009 |
| JP | 2009-264567 A | 11/2009 |
| JP | 2012-127444 A | 7/2012 |
| JP | 2012-197887 A | 10/2012 |
| JP | 2014-145388 A | 8/2014 |
| WO | 2006/036570 A2 | 4/2006 |

* cited by examiner

US 9,970,479 B2

THRUST BEARING

This application is a Continuation application based on International Application No. PCT/JP2015/052317, filed Jan. 28, 2015, which claims priority on Japanese Patent Application No. 2014-15684, filed Jan. 30, 2014, and Japanese Patent Application No. 2014-205054, filed Oct. 3, 2014, the contents of which are incorporated herein by reference.

TECHNICAL FIELD

The present disclosure relates to a thrust bearing.

BACKGROUND

In the related art, as a bearing used for a high-speed rotating body, a thrust bearing is known which is disposed facing a thrust collar provided on a rotary shaft. As such a thrust bearing, a foil-type thrust bearing, namely a thrust foil bearing is well known. The bearing surface of the thrust foil bearing is formed of a flexible foil (a metal thin sheet) in order to absorb movement (axial displacement and inclination of the thrust collar) of the rotary shaft caused by vibration or impact, and the thrust foil bearing includes a foil structure which is provided under the bearing surface and flexibly supports the bearing surface.

As an example of such a thrust foil bearing, a structure is known in which a circular ring-shaped (annular shaped) bearing surface is formed of a plurality of individual piece-shaped foil pieces (top foil pieces) obtained by dividing an annular sheet in the circumferential direction thereof, and wave sheet-shaped foil pieces (bump foil pieces) support the top foil pieces (for example, refer to Patent Document 1). In addition, in such a thrust foil bearing, a thrust bearing is known in which each top foil piece (the thickness thereof is about 100 μm) is disposed at an inclination angle with respect to the thrust collar, and thereby the bearing clearance between the thrust collar and the top foil piece is formed in a wedge shape in side view. That is, the bearing clearance is formed so as to gradually decrease from the leading side toward the trailing side of the bearing clearance in the rotational direction of the thrust collar (the rotary shaft). Therefore, when the thrust collar rotates from the large side (the leading side) toward the small side (the trailing side) of the bearing clearance, a lubricating fluid flows into the wedge-shaped bearing clearance, and the load capability of the thrust bearing is obtained.

Only the edge on the leading side of the top foil piece in the rotational direction of the thrust collar (the rotary shaft) is fixed to a base plate, and the edge is configured as a fixed edge. When a bearing load increases, the top foil piece moves to be horizontal (parallel to the supported surface of the thrust collar) in a state where the fixed edge (the edge on the leading side) serves as a fulcrum, the inclination angle thereof decreases, and when the inclination angle becomes about 0.1°, the thrust bearing generates the maximum load capability. In addition, the bump foil piece is disposed so that the ridge line of a peak thereof is parallel to the edge on the trailing side of the top foil piece, and only the edge on the trailing side of the bump foil piece in the rotational direction of the thrust collar (the rotary shaft) is fixed to the base plate. That is, the edge on the leading side of the bump foil piece is configured as a free end.

The bump foil piece is disposed and fixed in this way because the pressure of a fluid lubrication film generated at the top foil piece becomes high at the small side (the trailing side) of the bearing clearance, and if this part is supported with a high rigidity, the load capability can be improved.

In addition, Patent Document 2 discloses a thrust foil bearing in which each top foil piece is supported by a wave sheet-shaped foil piece (a bump foil piece).

Furthermore, Patent Documents 3 to 5 disclose thrust foil bearings including a top foil and a back foil (a bump foil). Patent Document 6 discloses a radial foil bearing including a top foil and a back foil.

DOCUMENT OF RELATED ART

Patent Document

[Patent Document 1] Published Japanese Translation No. 2008-513701
[Patent Document 2] Japanese Unexamined Patent Application, First Publication No. H10-331847
[Patent Document 3] Japanese Unexamined Patent Application, First Publication No. 2005-155802
[Patent Document 4] Japanese Unexamined Patent Application, First Publication No. 2012-127444
[Patent Document 5] Japanese Unexamined Patent Application, First Publication No. 2014-145388
[Patent Document 6] Japanese Unexamined Patent Application, First Publication No. 2012-197887

SUMMARY

Technical Problem

When a rotary machine on which such a thrust bearing is mounted receives vibration or impact in the axial direction (the thrust direction) of the rotary shaft, the rotary shaft vibrates in the thrust direction relatively to a housing (a casing). The factor, which damps the vibration of the rotary shaft based on the above vibration or impact, includes friction damping acting on contact surfaces of foils. That is, when the thrust collar of the rotary shaft pushes the top foil via the fluid lubrication film, the bump foil positioned under the top foil is pushed. At this time, sliding (friction) occurs between the top foil and the bump foil or between the bump foil and the base plate, and thereby the movement thereof is damped.

However, damping may not be sufficient in the structure of the above-described thrust bearing in the related art, and contact may occur between the rotary shaft and a stationary part (a housing). For example, in a case where the rotary machine is a turbo machine, the impeller thereof may rub against the housing.

The present disclosure has been made in view of the above circumstances, and an object thereof is to provide a thrust bearing which can obtain a high friction damping effect and thereby can appropriately absorb vibration and impact in the thrust direction of a rotary shaft.

Solution to Problem

A first aspect of the present disclosure is a thrust bearing disposed so as to face a thrust collar provided on a rotary shaft, the thrust bearing including: a top foil disposed so as to face the thrust collar; a back foil disposed on a side of the top foil opposite to another side of the top foil facing the thrust collar; and an annular plate-shaped base plate disposed on a side of the back foil opposite to the top foil, the base plate supporting the back foil. The back foil is formed of a plurality of back foil pieces arranged in a circumferential direction of the base plate. The top foil is formed of a plurality of top foil pieces disposed on the back foil pieces. In addition, a vibration-damping foil piece is disposed in each of positions between the back foil pieces and the top foil pieces.

A second aspect of the present disclosure is that in the thrust bearing of the first aspect, at least one side of each back foil piece in the circumferential direction is divided into a plurality of portions in a radial direction thereof. In addition, at least one side of the vibration-damping foil piece in the circumferential direction is divided into a plurality of portions in the radial direction.

A third aspect of the present disclosure is that in the thrust bearing of the second aspect, the one side of the back foil piece in the circumferential direction is divided into the plurality of portions in the radial direction, and another side of the back foil piece in the circumferential direction is a continuous edge extending in the radial direction. In addition, the one side of the vibration-damping foil piece in the circumferential direction is divided into the plurality of portions in the radial direction, and another side of the vibration-damping foil piece in the circumferential direction is a continuous edge extending in the radial direction.

A fourth aspect of the present disclosure is that in the thrust bearing of the third aspect, the back foil piece is provided with a first slit between a plurality of back foil-divided portions divided in the radial direction. In addition, the vibration-damping foil piece is provided with a second slit between a plurality of vibration-damping foil-divided portions divided in the radial direction, the second slit overlapping the first slit.

A fifth aspect of the present disclosure is that in the thrust bearing of the third or fourth aspect, an edge on a leading side of each top foil piece in a rotational direction of the rotary shaft is a top foil-fixed edge fixed to the base plate. In addition, an edge on a leading side of the vibration-damping foil piece in the rotational direction of the rotary shaft is the continuous edge, and the continuous edge is fixed to the base plate together with the top foil-fixed edge of the top foil piece.

A sixth aspect of the present disclosure is that in the thrust bearing of the third or fourth aspect, an edge on a leading side of each top foil piece in a rotational direction of the rotary shaft is a top foil-fixed edge fixed to the base plate. In addition, an edge on a trailing side of the vibration-damping foil piece in the rotational direction of the rotary shaft is the continuous edge, and the continuous edge is fixed to the base plate together with the top foil-fixed edge of the top foil piece.

A seventh aspect of the present disclosure is that in the thrust bearing of the first aspect, an edge on a leading side of each top foil piece in a rotational direction of the rotary shaft is a top foil-fixed edge fixed to the base plate. In addition, an edge on a leading side of the vibration-damping foil piece in the rotational direction of the rotary shaft is fixed to the base plate together with the top foil-fixed edge of the top foil piece.

An eighth aspect of the present disclosure is that in the thrust bearing of the first aspect, an edge on a leading side of each top foil piece in a rotational direction of the rotary shaft is a top foil-fixed edge fixed to the base plate. In addition, an edge on a trailing side of the vibration-damping foil piece in the rotational direction of the rotary shaft is fixed to the base plate together with the top foil-fixed edge of the top foil piece.

A ninth aspect of the present disclosure is that in the thrust bearing of any one of the first to eighth aspects, the vibration-damping foil piece is formed of vibration-damping alloy.

A tenth aspect of the present disclosure is that in the thrust bearing of any one of the first to ninth aspects, an edge on a leading side of each top foil piece in a rotational direction of the rotary shaft is a top foil-fixed edge fixed to the base plate. In addition, the top foil piece includes a thin part in the vicinity on a trailing side of the top foil-fixed edge in the rotational direction of the rotary shaft, the thin part being formed to be thinner than another part of the top foil piece.

An eleventh aspect of the present disclosure is that in the thrust bearing of any one of the first to tenth aspects, each back foil piece is formed of a wave sheet-shaped bump foil piece in which peak parts and valley parts are alternately formed, an edge on a trailing side of the bump foil piece in a rotational direction of the rotary shaft is a bump foil-fixed edge fixed to the base plate, and the back foil piece is disposed so that an arrangement direction of the peak parts is non-parallel to the bump foil-fixed edge. In addition, the peak parts are formed so that the height of the peak parts gradually increases from a leading side toward a trailing side of the back foil piece in the rotational direction of the rotary shaft.

A twelfth aspect of the present disclosure is that in the thrust bearing of any one of the first to tenth aspects, each of support areas of the base plate supporting the back foil pieces is provided with an inclined surface whose height gradually increases from an edge on a leading side toward another edge on a trailing side of the inclined surface in a rotational direction of the rotary shaft.

A thirteenth aspect of the present disclosure is that in the thrust bearing of the twelfth aspect, each back foil piece is formed of a wave sheet-shaped bump foil piece in which peak parts and valley parts are alternately formed, and is disposed so that an arrangement direction of the peak parts is the same as an inclination direction of the inclined surface.

Effects

In a thrust bearing of the present disclosure, since a vibration-damping foil piece is disposed in each of positions between back foil pieces and top foil pieces, sliding (friction) can occur between the top foil piece and the vibration-damping foil piece and between the vibration-damping foil piece and the back foil piece. Thus, the area in which friction damping occurs increases, thereby a higher friction damping effect can be obtained than that in the related art, and therefore it is possible to appropriately absorb vibration and impact of the rotary shaft in the thrust direction.

DESCRIPTION OF EMBODIMENTS

Hereinafter, thrust bearings of the present disclosure are described in detail with reference to the drawings. In the following drawings, the scale of each member is appropriately changed in order to show each member in a recognizable size.

Figure 1:
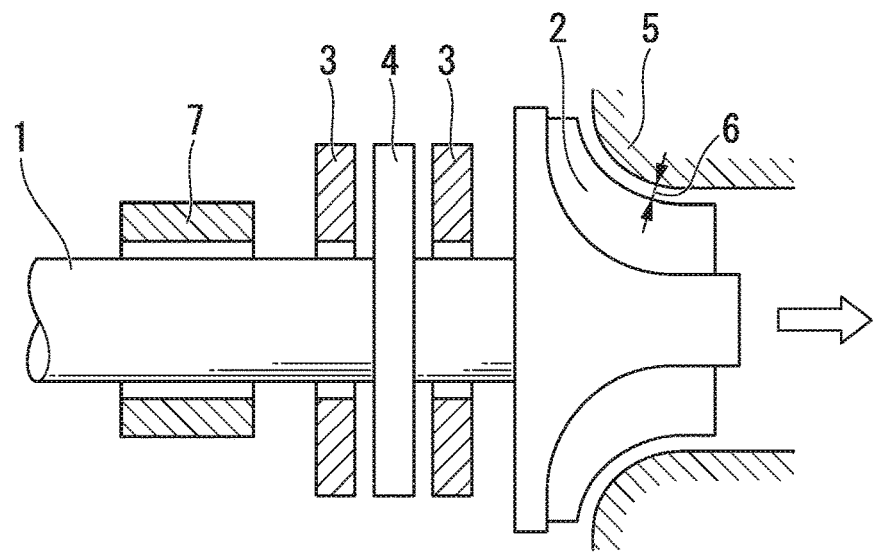
FIG. 1 is a schematic view showing an example of a turbo machine in which a thrust bearing of the present disclosure is provided.

FIG. 1 is a side view schematically showing an example of a turbo machine in which a thrust bearing of the present disclosure is provided. In FIG. 1, the reference sign 1 represents a rotary shaft, the reference sign 2 represents an impeller provided in an end part of the rotary shaft, and the reference sign 3 represents the thrust bearing of the present disclosure.

A thrust collar 4 is fixed to a part of the rotary shaft 1 close to a side thereof in which the impeller 2 is formed, and a pair of thrust bearings 3 are disposed on the thrust collar 4 so that the thrust collar 4 is sandwiched therebetween.

The impeller 2 is disposed inside a housing 5 which is a stationary part, and a tip clearance 6 is formed between the impeller 2 and the housing 5.

A radial bearing 7 is provided on the rotary shaft 1 at a position closer to the middle of the rotary shaft 1 than the thrust collar 4.

(First Embodiment)

Figure 2:
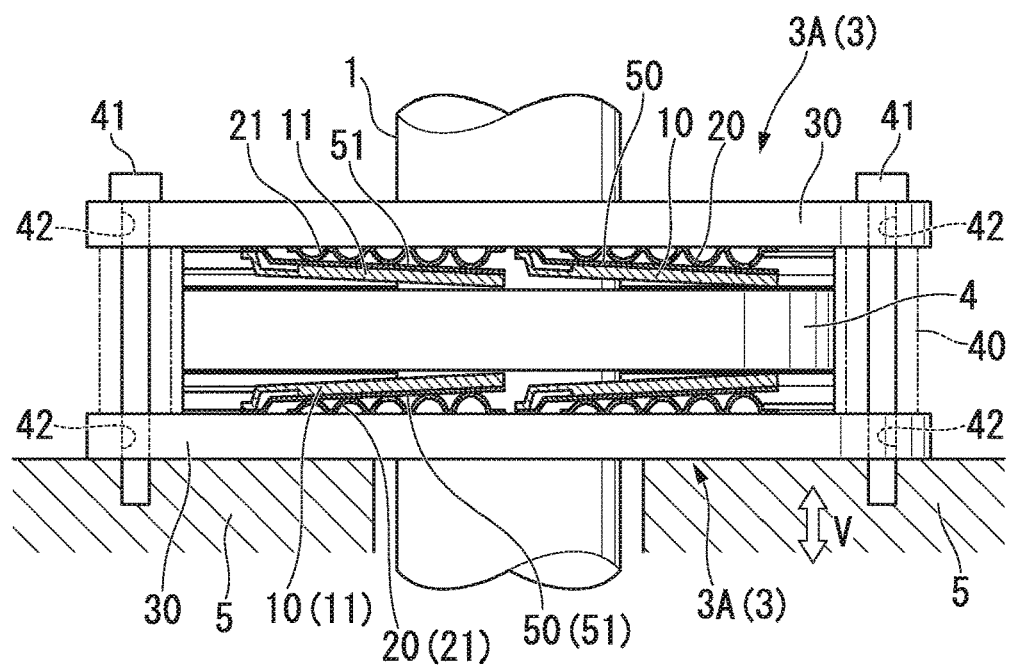
FIG. 2 is a view showing a first embodiment of the thrust bearing of the present disclosure, and is a side view of thrust bearings between which a thrust collar is sandwiched.
Figure 3A:
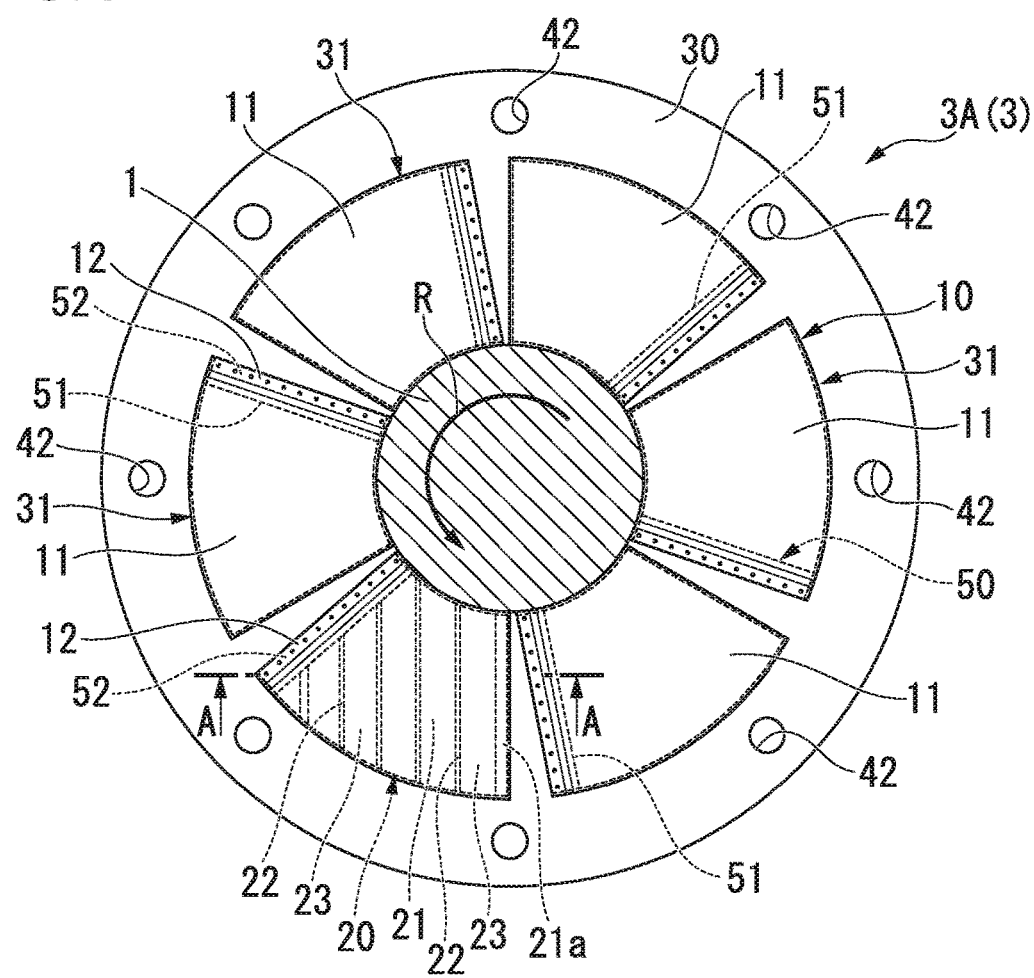
FIG. 3A is a plan view showing the first embodiment of the thrust bearing of the present disclosure.
Figure 3B:
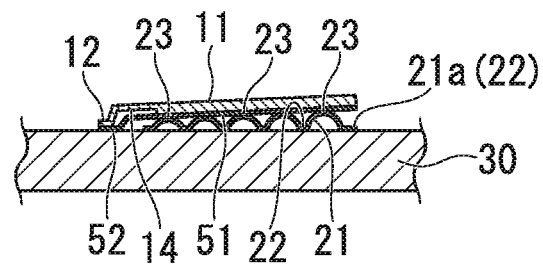
FIG. 3B is a cross-sectional view taken along A-A line in FIG. 3A.
Figure 3C:
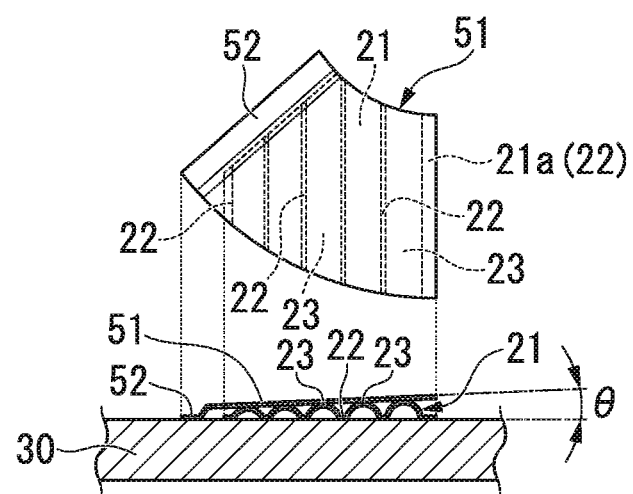
FIG. 3C is an explanatory view showing the shapes of a vibration-damping foil piece and a back foil piece of the first embodiment in which a plan view and a side view thereof correspond to each other.

FIGS. 2 and 3A to 3C are views showing a first embodiment of a thrust bearing 3 provided in the turbo machine having the above configuration. FIG. 2 is a side view of a pair of thrust bearings 3 between which the thrust collar 4 is sandwiched. FIG. 3A is a plan view of the thrust bearing 3. FIG. 3B is a cross-sectional view taken along A-A line in FIG. 3A. FIG. 3C is an explanatory view showing the shapes of a vibration-damping foil piece and a back foil piece in which a plan view and a side view thereof correspond to each other.

As shown in FIG. 2, in the first embodiment, thrust bearings 3A(3) are disposed on two sides of the thrust collar 4 so that the thrust collar 4 is sandwiched therebetween. The pair of thrust bearings 3A(3) have the same structure, and are annular shaped (cylindrical shaped) devices disposed so as to face the annular plate-shaped thrust collar 4 fixed to the rotary shaft 1. The thrust bearings 3A(3) are provided encircling the rotary shaft 1.

The thrust bearing 3A includes a top foil 10 disposed so as to face the thrust collar 4, a back foil 20 disposed so as to face a side of the top foil 10 opposite to another side of the top foil 10 facing the thrust collar 4, and an annular plate-shaped base plate 30 disposed on a side of the back foil 20 opposite to the top foil 10, and further includes a vibration-damping foil 50 between the top foil 10 and the back foil 20.

In this embodiment, a cylindrical bearing spacer 40 shown by a dashed double-dotted line is sandwiched between the base plates 30 of the pair of thrust bearings 3A (refer to FIG. 2), and the base plates 30 are connected to each other via the bearing spacer 40 using fastening bolts 41. In addition, the outer surface of one base plate 30 is fixed to the housing 5 using the fastening bolts 41, and thus the pair of thrust bearings 3A are fixed to the housing 5 using the fastening bolts 41 in a state where the thrust collar 4 is sandwiched therebetween.

As shown in FIG. 3A, the base plate 30 is an annular plate-shaped metal member, and an outer circumferential part of the base plate 30 is provided with a plurality of through-holes 42 (in this embodiment, the number thereof is eight) allowing the fastening bolts 41 to pass therethrough. The surface of the base plate 30 facing the thrust collar 4 is provided with a support area which supports the back foil 20, the vibration-damping foil 50 and the top foil 10. In this embodiment, as described later, the back foil 20, the vibration-damping foil 50 and the top foil 10 are formed of a plurality (six) of back foil pieces 21, vibration-damping foil pieces 51 and top foil pieces 11, respectively. Thus, the base plate 30 is provided with six support areas 31 formed by dividing the surface of the base plate 30 into six areas (into equivalent six areas) in the circumferential direction thereof. It is noted that in this embodiment, the six support areas 31 are areas on the design, and the surface of the base plate 30 including the support areas 31 is formed in a mere flat surface.

As shown in FIG. 2, the back foil piece 21, the vibration-damping foil piece 51 and the top foil piece 11 are disposed in this order on each of the support areas 31, and are supported thereby.

As shown in FIGS. 3A to 3C, the back foil 20 is formed of six back foil pieces 21 arranged in the circumferential direction of the base plate 30. The back foil pieces 21 are disposed on the support areas 31 of the base plate 30, and thereby are arranged in the circumferential direction of the base plate 30. In addition, each of the back foil pieces 21 is formed to be slightly smaller than the vibration-damping foil piece 51 or the top foil piece 11 described later, and therefore as shown in FIG. 3A, the back foil piece 21 is covered with the top foil piece 11 and the vibration-damping foil piece 51 at a position above the base plate 30 without being exposed to the thrust collar 4.

The back foil 20 including the back foil pieces 21 is formed of foils (thin sheets), and resiliently supports the top foil 10 (the top foil pieces 11). For the back foil 20, for example, it is possible to use a bump foil, a spring foil disclosed in Japanese Unexamined Patent Application, First Publication No. 2006-57652 or in Japanese Unexamined Patent Application, First Publication No. 2004-270904, a back foil disclosed in Japanese Unexamined Patent Application, First Publication No. 2009-299748, or the like. Although the spring foils disclosed in Japanese Unexamined Patent Application, First Publication No. 2006-57652 and in Japanese Unexamined Patent Application, First Publication No. 2004-270904, and the back foil disclosed in Japanese Unexamined Patent Application, First Publication No. 2009-299748 are foils used for a radial bearing, if each foil is developed in a flat shape and is formed in an annular sheet shape, the foil is used for a thrust bearing.

In this embodiment, as shown in FIG. 3C, the back foil 20 is formed of a bump foil, and thus the back foil piece 21 is formed of a bump foil piece. The back foil piece 21 (the bump foil piece) is molded in a wave sheet shape by press-molding a foil (a metal thin sheet) having a thickness of several hundred micrometers, and as shown by a dashed line in FIG. 3C, the whole shape thereof is formed in an approximately pentagonal shape close to a trapezoid shape.

The back foil piece 21 molded in a wave sheet shape in the above way is formed so that valley parts 22 contacting the base plate 30 and peak parts 23 contacting the top foil piece 11 are alternately disposed. The edge on the trailing side of the back foil piece 21 in the rotational direction of the rotary shaft 1 is configured as a fixed edge 21a (a bump foil-fixed edge) of the back foil piece 21 (a bump foil piece). As shown in FIG. 3A, the valley parts 22 and the peak parts 23 are arranged in a direction orthogonal to the fixed edge (an edge) 21a of the back foil piece 21. That is, the arrangement direction of the valley parts 22 and the peak parts 23 is set to a direction orthogonal to the fixed edge 21a, and thus the valley parts 22 and the peak parts 23 are formed so as to extend parallel to the fixed edge 21a. In addition, the arrangement direction of the plurality of peak parts 23 may be set to be non-parallel to the extending direction of the fixed edge 21a.

The valley parts 22 and the peak parts 23 are formed at approximately regular intervals. In addition, the height of the peak parts 23 is formed so as to increase at a constant rate toward the fixed edge 21a from the opposite side of the back foil piece 21 to the fixed edge 21a, namely toward the trailing side of the back foil piece 21 in the rotational direction of the rotary shaft 1 (the thrust collar 4) shown by the arrow symbol R in FIG. 3A. As shown in FIG. 3C, an end part of the back foil piece 21 opposite to the fixed edge 21a is removed by being cut in the length direction of the valley part 22.

The fixed edge 21a of the back foil piece 21 is disposed at approximately the same position in plan view as the edges on the trailing side of the vibration-damping foil piece 51 and the top foil piece 11 described later in the rotational direction of the rotary shaft 1. The back foil piece 21 is spot-welded (welded at points) on the base plate 30 in the forming direction of the valley part 22 serving as the fixed edge 21a, and thus is fixed thereto.

At this time, since the entire fixed edge 21a of the back foil piece 21 is formed of one continuous valley part 22, this entire valley part 22 can be easily welded. Thus, the fixing of the back foil piece 21 through welding can be easily performed.

In addition, the fixing of the fixed edge 21a to the base plate 30 can be performed using fastening screws or the like other than spot-welding.

As shown in FIG. 3A, the vibration-damping foil 50 is formed of six vibration-damping foil pieces 51 arranged in the circumferential direction of the base plate 30. Each of the vibration-damping foil pieces 51 is formed of a thin sheet (a foil) made of metal or alloy, and particularly it is preferable that the vibration-damping foil piece 51 be formed of vibration-damping alloy. The vibration-damping alloy includes composite-type, ferromagnetic-type, transposition-type and twin-crystal-type alloys, and any alloy thereof is available. Specifically, for the composite-type alloy, flaky graphite cast iron (Fe—C—Si system), Cosmal-Z (Al—Zn system) and the like are used. For the ferromagnetic-type alloy, TD nickel (Ni system), 13%-chrome steel (Fe—Cr system), Silentalloy (Fe—Cr—Al system), Tranqaloy (Fe—Cr—Al—Mn system), Gentalloy (Fe—Cr—Mo system), NIVCO10 (Co—Ni system) and the like are used. For the transposition-type alloy, KIXI alloy (Mn—Zr system) and the like are used. For the twin-crystal-type alloy, Sonostone (Mn—Cu system), Incramute (Cu—Mn—Al system), Nitinol (Ni—Ti system) and the like are used. When the vibration-damping foil piece 51 is manufactured of such vibration-damping alloy, the vibration-damping foil piece 51 obtains a vibration-damping function caused by not only sliding (friction) but also by deformation (bending deformation) thereof, and a high damping effect can be obtained. In addition, instead of these vibration-damping alloys, the vibration-damping foil piece 51 may be formed of metal such as aluminum or copper.

The vibration-damping foil piece 51 is formed having a thickness of about ⅕ to ½ of the thickness of the top foil piece 11 described later, specifically having a thickness of about 30 to 75 μm. When the vibration-damping foil piece 51 is formed having such a thickness, the vibration-damping foil piece 51 has a favorable following characteristic for the top foil piece 11, and thus obtains a high friction damping effect. If the thickness of the vibration-damping foil piece 51 becomes less than ⅕ of the thickness of the top foil piece 11, friction due to a rub between the vibration-damping foil piece 51 and the top foil piece 11 or between the vibration-damping foil piece 51 and the back foil piece 21 decreases, and the friction damping effect may deteriorate. In addition, if the thickness of the vibration-damping foil piece 51 becomes greater than ½ of the thickness of the top foil piece 11, the rigidity thereof increases, and thus the following characteristic thereof for the top foil piece 11 may deteriorate.

As shown in FIG. 3C, the vibration-damping foil piece 51 is formed in an approximate trapezoid shape in which an apex side (a part including the apex) of a sector shape is removed from the sector shape, and the inner circumferential side (the inner side in the radial direction) and the outer circumferential side (the outer side in the radial direction) of the trapezoid shape are formed in arcs. The vibration-damping foil piece 51 having such a shape is disposed covering a back foil piece 21 at a position above each support area 31 of the base plate 30, and the vibration-damping foil pieces 51 are arranged at regular intervals in the circumferential direction of the base plate 30 and as a whole are disposed in an approximate annular plate shape, thereby configuring the vibration-damping foil 50.

The vibration-damping foil piece 51 is formed to be slightly smaller than the support area 31 and is formed to be slightly larger than the back foil piece 21. Accordingly, the vibration-damping foil pieces 51 next to each other in the circumferential direction do not contact each other, and the vibration-damping foil piece 51 is disposed on each support area 31 in a state where the vibration-damping foil piece 51 covers the top surface of the back foil piece 21 without exposing the back foil piece 21 to the thrust collar 4. However, the present disclosure is not limited to this configuration, and the vibration-damping foil piece 51 may be formed in the same size as the back foil piece 21 or may be formed to be smaller than the back foil piece 21.

The edge on the leading side of the vibration-damping foil piece 51 in the rotational direction of the rotary shaft 1 (the thrust collar 4) is set to a fixed edge 52, and the vibration-damping foil piece 51 is fixed to the base plate 30 through the fixed edge 52. The fixing of the fixed edge 52 to the base plate 30 is performed through spot-welding (welding at points) similar to that of the fixed edge 21a of the back foil piece 21. It is noted that in this embodiment, as shown in FIG. 3B, the fixed edge 52 is spot-welded on the base plate 30 together with a fixed edge 12 of the top foil piece 11 described later. In addition, the fixing of the fixed edges 52 and 12 to the base plate 30 may also be performed using fastening screws or the like other than spot-welding. Furthermore, bending machining is applied to the vibration-damping foil piece 51 on the trailing side of the fixed edge 52 in the rotational direction, whereby the vibration-damping foil piece 51 is formed in a stepped shape so as to absorb the height of the peak part 23 of the back foil piece 21, and the trailing side of the vibration-damping foil piece 51 in the rotational direction is placed on the peak parts 23 of the back foil piece 21. In addition, in this embodiment, the trailing side of the vibration-damping foil piece 51 in the rotational direction is set to a free end which is merely supported by the peak part 23 of the back foil piece 21 without being fixed.

As shown in FIG. 3A, the top foil 10 is formed of six top foil pieces 11 arranged in the circumferential direction of the base plate 30. Each of the top foil pieces 11 is formed of a metal thin sheet (a foil) having a thickness of several hundred micrometers, for example, about 150 μm, into an approximate trapezoid shape in which an apex side of a sector shape is removed from the sector shape, and the inner circumferential side (the inner side in the radial direction) and the outer circumferential side (the outer side in the radial direction) of the trapezoid shape are formed in arcs. That is, the top foil piece 11 is formed in approximately the same size and shape as the vibration-damping foil piece 51. The top foil piece 11 having such a shape is disposed covering a vibration-damping foil piece 51 at a position above each support area 31 of the base plate 30, and the top foil pieces 11 are arranged at regular intervals in the circumferential direction of the base plate 30 and as a whole are disposed in an approximate annular sheet shape, thereby forming the top foil 10.

The top foil piece 11 is formed to be slightly smaller than the support area 31 similarly to the vibration-damping foil piece 51 and is formed to be slightly larger than the back foil piece 21.

Accordingly, the top foil pieces 11 next to each other in the circumferential direction do not contact each other, and the top foil piece 11 is disposed on each support area 31 in a state where the top foil piece 11 covers the top surfaces of the back foil piece 21 and the vibration-damping foil piece 51 without exposing the back foil piece 21 and the vibration-damping foil piece 51 to the thrust collar 4. However, the present disclosure is not limited to this configuration, and for example, the top foil piece 11 may be formed in the same size as the vibration-damping foil piece 51 or the back foil piece 21 or may be formed to be smaller than the vibration-damping foil piece 51 or the back foil piece 21.

The edge on the leading side of the top foil piece 11 in the rotational direction of the rotary shaft 1 (the thrust collar 4) is set to the fixed edge 12 (a top foil-fixed edge), and the top foil piece 11 is fixed to the base plate 30 through the fixed edge 12. That is, as shown in FIG. 3B, the fixed edge 12 is overlapped with the top of the fixed edge 52 of the vibration-damping foil piece 51 and is fixed to the base plate 30 through spot-welding (welding at points) together with the fixed edge 52. Therefore, the welded points (the fixed points) through spot-welding can be set to the same as a case in the related art in which the vibration-damping foil piece 51 is not employed, and thus it is possible to limit an increase of the manufacturing cost.

That is, in this embodiment, the edge on the leading side of the top foil piece 11 in the rotational direction of the rotary shaft 1 is set to the fixed edge 12 fixed to the base plate 30. The edge on the leading side of the vibration-damping foil piece 51 in the rotational direction of the rotary shaft 1 is set to the fixed edge 52 fixed to the base plate 30. The fixed edge 52 is fixed to the base plate 30 together with the fixed edge 12 of the top foil piece 11 disposed overlapping the vibration-damping foil piece 51.

The fixing of the fixed edge 12 to the base plate 30 can also be performed using fastening screws or the like together with the fixed edge 52 of the vibration-damping foil piece 51.

As shown in FIG. 3B, bending machining is applied to the top foil piece 11 on the trailing side of the fixed edge 12 in the rotational direction, whereby the top foil piece 11 is formed in a stepped shape so as to absorb the height of the peak part 23 of the back foil piece 21, and the trailing side of the top foil piece 11 in the rotational direction is placed on the peak parts 23 of the back foil piece 21. In addition, the edge (the trailing edge) on the trailing side of the top foil piece 11 in the rotational direction is set to a free end which is similar to that of the vibration-damping foil piece 51 and is merely supported by the peak part 23 of the back foil piece 21 without being fixed.

In this embodiment, the back foil piece 21 is disposed so that the valley parts 22 and the peak parts 23 are arranged in a direction orthogonal to the fixed edge 21a of the back foil piece 21 as described above. Therefore, when the vibration-damping foil piece 51 and the top foil piece 11 are placed on the back foil piece 21, the vibration-damping foil piece 51 and the top foil piece 11 are disposed inclining at an initial inclination angle set by the peak parts 23 of the back foil piece 21 so that the separation between the vibration-damping foil piece 51 or the top foil piece 11 and the inner surface of the base plate 30 gradually increases from the fixed edge 52 or 12 toward the fixed edge 21*a* of the back foil piece 21 in the arrangement direction of the peak parts 23.

The initial inclination angle is an inclination angle of the top foil piece 11 to the base plate 30 when the load is zero. In addition, the inclination angle is an angle (inclination) θ determined by an increment of the height of the peak parts 23 of the back foil piece 21 as shown in FIG. 3C. Thus, when the load increases, the peak parts 23 of the back foil piece 21 are pushed toward the base plate 30, and the entire peak parts 23 are flattened, whereby the inclination angle θ becomes less than the initial inclination angle.

As shown in FIG. 3B, the top foil piece 11 includes a thin part 14 in the vicinity of the fixed edge 12, namely in the vicinity on the trailing side of the fixed edge 12 in the rotational direction of the rotary shaft 1, and the thin part 14 is formed to be thinner than another part of the top foil piece 11. The thin part 14 is linearly formed along the fixed edge 12 and is formed having a thickness of about 50% to 70% of the thickness (several hundred micrometers) of the other part configuring the top foil piece 11. The thin part 14 can be formed through, for example, etching.

The thin part 14 is formed so as not to be positioned right above the top (the ridge line) of the peak part 23 closest to the fixed edge 12 of the peak parts 23 of the back foil piece 21 shown in FIG. 3B. That is, the width of the thin part 14 is set and formed so that the thin part 14 is positioned between the fixed edge 12 and the top (the ridge line) of the peak part 23 closest to the fixed edge 12. Accordingly, a part (another part) of the top foil piece 11 other than the thin part 14 is placed on all the peak parts 23 via the vibration-damping foil piece 51 and is evenly supported thereby. In addition, since the thin part 14 is formed, a part of the top foil piece 11 on the trailing side of the thin part 14 in the rotational direction can easily and smoothly incline. Furthermore, since the thin part 14 is formed in this way, the thickness of a part of the top foil piece 11 other than the thin part 14 can be increased compared to that in the related art.

Next, the operation of the thrust bearing 3A(3) having the above configuration is described.

In this embodiment, as shown in FIG. 2, the thrust bearings 3A are provided on two sides of the thrust collar 4. When the thrust bearings 3A are provided on two sides of the thrust collar 4 in this way, the movement amount of the thrust collar 4 in the thrust direction can be minimized. That is, since the thrust movement amount thereof is decreased, the tip clearance 6 shown in FIG. 1 can be narrowed, and thereby the fluid performance can be improved.

In order to minimize the movement amount in the thrust direction, both thrust bearings 3A are disposed to be close to the thrust collar 4 without forming a large gap therebetween. Accordingly, the top foil pieces 11 (the top foils 10) of both thrust bearings 3A are brought into a state of being slightly pressed on the thrust collar 4. At this time, since the top foil piece 11 is provided with the thin part 14 in this embodiment, the trailing side (the free end-side) of the top foil piece 11 in the rotational direction is configured to easily incline (to easily bend). Therefore, the pressing force which occurs in proportion to the pressing amount becomes small, and thus the starting torque of the rotary shaft 1 becomes small.

In the related art, an inclination angle greater than an optimum angle is applied to a top foil piece in advance in order that the inclination angle of the top foil piece becomes the optimum angle when the load increases. Therefore, in a state where the rotation thereof stops, two top foil pieces contact two surfaces of the thrust collar 4 and are brought into a state of being pressed on the thrust collar 4 (a state where a preload is added thereto). However, since the thickness of the top foil piece is constant in the related art, the pressing force (the preload) on the thrust collar 4 becomes high, and the starting torque becomes large.

In contrast, in this embodiment, since the top foil piece 11 is provided with the thin part 14 as described above, the starting torque becomes small.

When the rotary shaft 1 rotates and the thrust collar 4 starts rotating, while the thrust collar 4 and the top foil piece 11 rub on each other, an ambient fluid is pushed into a wedge-shaped space formed therebetween. When the rotation speed of the thrust collar 4 reaches a constant rotation speed, a fluid lubrication film is formed therebetween. The top foil pieces 11 (the top foil 10) are pressed on the back foil pieces 21 (the back foil 20) via the vibration-damping foil pieces 51 (the vibration-damping foil 50) due to the pressure of the fluid lubrication film, and the thrust collar 4 leaves a state of contacting the top foil pieces 11 and rotates in a non-contact state with the top foil pieces 11.

In this state, when vibration or impact is added to the rotary shaft 1 in the axial direction thereof as shown by an arrow symbol V in FIG. 2, the thrust collar 4 approaches the top foil piece 11, whereby the pressure of a fluid lubrication film is increased, and the top foil piece 11 is further pushed toward the back foil piece 21.

At this time, friction occurs based on sliding at contact surfaces of the top foil piece 11 and the vibration-damping foil piece 51 and at contact surfaces of the vibration-damping foil piece 51 and the back foil piece 21, and thereby the pushed movement of the top foil piece 11 is limited. In addition, at the time the pushed top foil piece 11 returns to the original state thereof, friction based on sliding also occurs.

Heat is generated due to friction, kinetic energy such as vibration is changed into thermal energy and consumed, and thus a friction damping effect is obtained. Therefore, it is possible to reliably prevent, through the friction damping effect of the thrust bearing 3A having the above configuration, the impeller 2 shown in FIG. 1 from rubbing against the housing 5.

In the thrust bearing 3A(3) of this embodiment, a vibration-damping foil piece 51 is disposed in each of the positions between back foil pieces 21 (bump foil pieces) and top foil pieces 11. Therefore, when the rotary shaft 1 receives vibration or impact in the axial direction (the thrust direction) thereof and the top foil piece 11 is pushed by the thrust collar 4 via a fluid lubrication film, sliding (friction) occurs between a top foil 10 and a back foil 20 (a bump foil) in the related art, whereas in the thrust bearing 3A(3), sliding (friction) occurs between the top foil piece 11 and the vibration-damping foil piece 51 and between the vibration-damping foil piece 51 and the back foil piece 21. Thus, the area in which friction damping occurs increases, whereby a higher friction damping effect can be obtained than that in the related art, and it is possible to appropriately absorb vibration and impact of the rotary shaft 1 in the thrust direction.

The edge on the leading side of the vibration-damping foil piece 51 in the rotational direction of the rotary shaft 1 is configured as the fixed edge 52, and the fixed edge 52 is fixed to the base plate 30 together with the fixed edge 12 of the top foil piece 11. Therefore, the top foil piece 11 can be formed in the same shape as that in the related art without changing the shape of the top foil piece 11 from that in the related art, and thus it is possible to limit an increase of the cost. That is, in a case where the fixed edge 12 of the top foil piece 11 is directly attached to the base plate 30 without inserting the fixed edge 52 of the vibration-damping foil piece 51 into a position under the fixed edge 12 of the top foil piece 11, the height of the top foil piece 11 has to be increased by the thickness of the vibration-damping foil piece 51 compared to the related art. However, when the fixed edge 12 of the top foil piece 11 is fixed to be overlapped with the fixed edge 52 of the vibration-damping foil piece 51, the above-described modifications in design can become unnecessary, and a new mold or the like does not have to be prepared.

The fixed edge 52 of the vibration-damping foil piece 51 is fixed to the base plate 30 together with the fixed edge 12 of the top foil piece 11. Therefore, the number of fixed points of foil pieces through spot-welding (welding at points) or the like can be the same as that in the related art in which the vibration-damping foil piece 51 is not employed, and thus it is possible to limit an increase of the manufacturing cost.

In a case where the vibration-damping foil piece 51 is formed of vibration-damping alloy, a damping effect based on deformation (bending deformation) of the vibration-damping foil piece 51 is added to friction damping based on sliding between foils, and therefore a high friction damping effect can be obtained.

The thin part 14 is provided in the top foil piece 11 in the vicinity on the trailing side of the fixed edge 12 in the rotational direction. Therefore, when a load is added to the top foil piece 11, the trailing side of the top foil piece 11 in the rotational direction can easily and smoothly incline, and thus the starting torque is reduced. In addition, after the rotary shaft 1 starts rotating, since the top foil piece 11 also easily and smoothly inclines, the optimum inclination angle is easily obtained, and the load capability is improved.

Since the pressure of a fluid lubrication film is increased when a high thrust load is added to the bearing, a part of the top foil piece 11, which is not directly supported by the back foil piece 21 via the vibration-damping foil piece 51, that is, which is positioned right above the valley part 22 of the back foil piece 21, may be bent at this time, and a pressure may escape from this part and the load capability may deteriorate.

However, in this embodiment, since the thin part 14 is provided in a part of the top foil piece 11 close to the fixed edge 12, the thickness of the top foil piece 11 can be increased compared to that in the related art without preventing the inclining (bending) movement of the top foil piece 11. Thus, when the thickness of the top foil piece 11 is increased in this way and the rigidity thereof is improved, the bending of a part of the top foil piece 11 which is not supported by the back foil piece 21 can be decreased, and the deterioration of the load capability can be limited.

(Second Embodiment)

Figure 4:
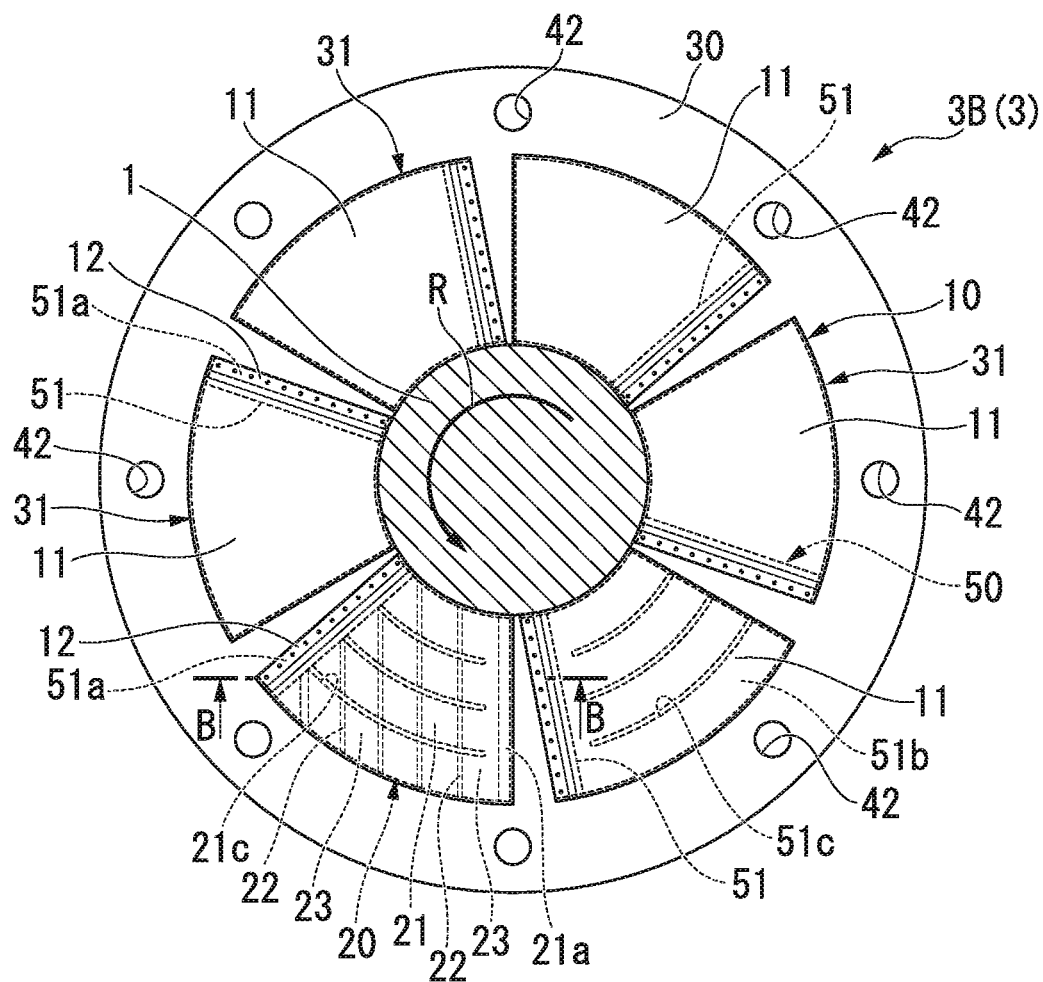
FIG. 4 is a plan view of a second embodiment of the thrust bearing of the present disclosure.
Figure 5A:
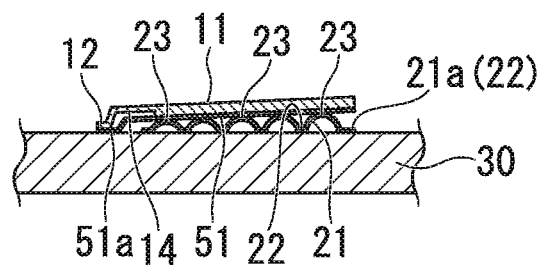
FIG. 5A is a cross-sectional view taken along B-B line in FIG. 4.
Figure 5B:
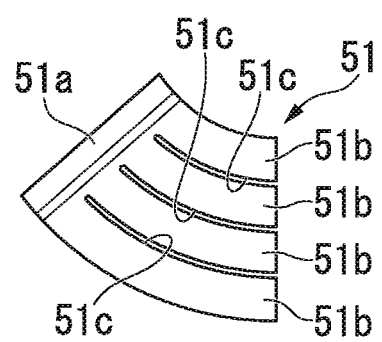
FIG. 5B is a plan view of a vibration-damping foil piece of the second embodiment.
Figure 5C:
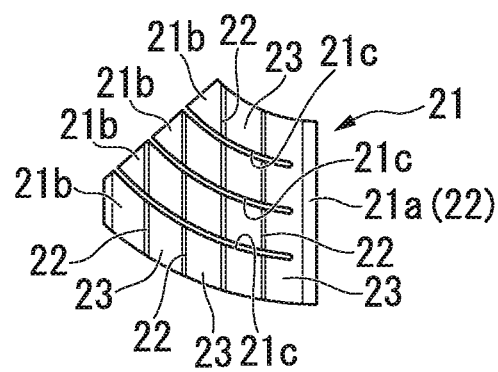
FIG. 5C is a plan view of a back foil piece of the second embodiment.
Figure 5D:
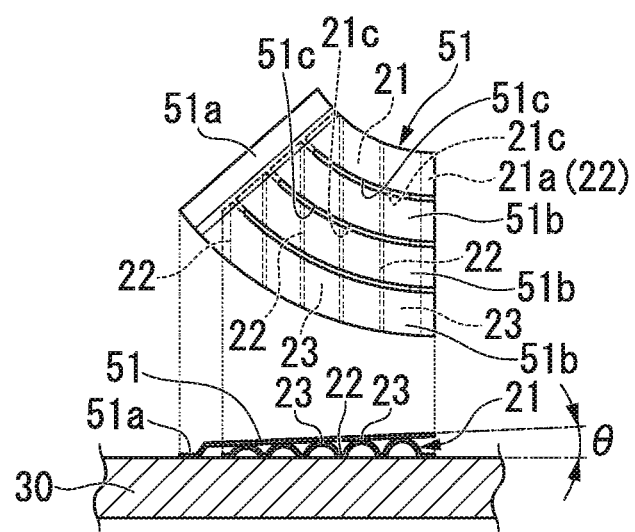
FIG. 5D is an explanatory view showing the shapes of the vibration-damping foil piece and the back foil piece of the second embodiment in which a plan view and a side view thereof correspond to each other.

Next, a second embodiment of the thrust bearing 3 of the present disclosure is described with reference to FIGS. 4, 5A to 5D. FIG. 4 is a plan view of a thrust bearing. FIG. 5A is a cross-sectional view taken along B-B line in FIG. 4. FIG. 5B is a plan view of a vibration-damping foil piece. FIG. 5C is a plan view of a back foil piece. FIG. 5D is an explanatory view showing the shapes of the vibration-damping foil piece and the back foil piece in which a plan view and a side view thereof correspond to each other.

As shown in FIGS. 5B and 5C, a thrust bearing 3B(3) of the second embodiment mainly differs from the thrust bearing 3A(3) of the first embodiment in that at least one side of a back foil piece 21 in the circumferential direction is divided into a plurality of portions in the radial direction, and at least one side of a vibration-damping foil piece 51 in the circumferential direction is divided into a plurality of portions in the radial direction. In the description of this embodiment, components which are the same as those of the first embodiment are attached with the same reference signs as those of the first embodiment, and duplicate descriptions are omitted. Hereinafter, configurations different from the first embodiment are mainly described.

One side of the back foil piece 21 in the circumferential direction, namely in this embodiment, an opposite side (the leading side in the rotational direction) to a fixed edge 21a which is the edge on the trailing side of the back foil piece 21 in the rotational direction of a rotary shaft 1, is equally divided into four (a plurality of) portions in the radial direction, and the fixed edge 21a which is the other side of the back foil piece 21 is set to a continuous edge extending in the radial direction. Since the opposite side to the fixed edge 21a of the back foil piece 21 is divided into four portions in this way, the back foil piece 21 is configured of four strip-shaped back foil-divided portions 21b (bump foil-divided portions) and the fixed edge 21a (a continuous edge).

A first slit 21c is formed between each pair of back foil-divided portions 21b next to each other of the four strip-shaped back foil-divided portions 21b. In this embodiment, each of the first slits 21c is formed in an arc shape which forms part of the circumference of a circle coaxial with another circle formed of the outer circumferences of the back foil pieces 21. The width of the first slit 21c is set to a value such that the back foil-divided portions 21b next to each other in the radial direction can individually move without contacting each other. Since one side of the back foil piece 21 is divided into the four strip-shaped back foil-divided portions 21b through the first slits 21c having such a width, the four strip-shaped back foil-divided portions 21b can individually move.

The end (the end close to the fixed edge 21a) of the first slit 21c of this embodiment is positioned in the vicinity of the fixed edge 21a. In addition, the above end of the first slit 21c may be in contact with the fixed edge 21a.

When the length of the back foil piece 21 in the circumferential direction is represented by a sign $L_{11}$, the length (the width) of the fixed edge 21a in the circumferential direction is represented by a sign $L_{12}$, and the length of the first slit 21c in the circumferential direction (namely, the length of the back foil-divided portion 21b in the circumferential direction) is represented by a sign $L_{13}$, these lengths may satisfy the following formula (1).

$$\tfrac{2}{3} \times (L_{11}-L_{12}) \leq L_{13} \leq 1 \times (L_{11}-L_{12}) \qquad \text{Formula (1)}$$

In this embodiment, when peak parts 23 arranged in a row are compared to each other, the peak parts 23 of two back foil-divided portions 21b positioned on the outer circumferential side (the outer side in the radial direction) of the back foil piece 21 are formed so that the heights of the tops thereof are slightly greater than those of the peak parts 23 of two back foil-divided portions 21b positioned on the inner circumferential side (the inner side in the radial direction) of the back foil piece 21. Therefore, the force of the back foil piece 21 supporting the top foil piece 11 increases at the outer circumferential side and decreases at the inner circumferential side, and can balance with the pressure of a fluid lubrication film. That is, since the pressure of the fluid lubrication films becomes a high pressure at the outer circumferential side of the top foil piece 11 and becomes a low pressure at the inner circumferential side thereof, when the back foil piece 21 comparatively strongly supports the top foil piece 11 at the outer circumferential side thereof and comparatively weakly supports the top foil piece 11 at the inner circumferential side thereof, the forces added to the outer and inner circumferential sides of the top foil piece 11 can balance with each other, and the outer and inner circumferential sides of the top foil piece 11 are approximately evenly pushed toward the back foil piece 21.

As shown in FIG. 5B, the shape of the vibration-damping foil piece 51 is formed in an approximate trapezoid shape in which an apex side of a sector shape is removed from the sector shape, and the inner circumferential side (the inner side in the radial direction) and the outer circumferential side (the outer side in the radial direction) of the trapezoid shape are formed in arcs. One side of the vibration-damping foil piece 51 in the circumferential direction, namely in this embodiment, the trailing side of the vibration-damping foil piece 51 in the rotational direction of the rotary shaft 1, is divided into four (a plurality of) portions in the radial direction, a fixed edge 51a which is the other side (the leading side in the rotational direction) of the vibration-damping foil piece 51 is set to a continuous edge extending in the radial direction. Since the opposite side of the vibration-damping foil piece 51 to the fixed edge 51a is divided into four portions in this way, the vibration-damping foil piece 51 is configured of four strip-shaped vibration-damping foil-divided portions 51b and the fixed edge 51a (a continuous edge).

A second slit 51c is formed between each pair of vibration-damping foil-divided portions 51b of the four strip-shaped vibration-damping foil-divided portions 51b. In this embodiment, each of the second slits 51c is formed in an arc shape forming part of the circumference of a circle coaxial with another circle formed of the outer circumferences of the vibration-damping foil pieces 51. The width of the second slit 51c is set to a value such that the vibration-damping foil-divided portions 51b next to each other in the radial direction can individually move without contacting each other. In addition, as shown in FIG. 5D, the second slit 51c is formed and disposed so as to overlap the first slit 21c of the back foil piece 21.

The end (the end close to the fixed edge 51a) of the second slit 51c of this embodiment is positioned in the vicinity of the fixed edge 51a. In addition, the above end of the second slit 51c may be in contact with the fixed edge 51a.

When the length of the vibration-damping foil piece 51 in the circumferential direction is represented by a sign $L_{21}$, the length (the width) of the fixed edge 51a in the circumferential direction is represented by a sign $L_{22}$, and the length of the second slit 51c in the circumferential direction (namely, the length of the vibration-damping foil-divided portion 51b in the circumferential direction) is represented by a sign $L_{23}$, these lengths may satisfy the following formula (2).

$$\frac{2}{3} \times (L_{21} - L_{22}) \leq L_{23} \leq 1 \times (L_{21} - L_{22})$$  Formula (2)

Since one side of the vibration-damping foil piece 51 is divided into the four strip-shaped vibration-damping foil-divided portions 51b through the second slits 51c, the four strip-shaped vibration-damping foil-divided portions 51b can independently move. In addition, the four strip-shaped vibration-damping foil-divided portions 51b are placed on the tops of the peak parts 23 of the four strip-shaped back foil-divided portions 21b in a state of direct contact therewith, and thereby each vibration-damping foil-divided portion 51b can easily follow the movement of one back foil-divided portion 21b of the four strip-shaped back foil-divided portions 21b which the vibration-damping foil-divided portion 51b corresponds to (contacts).

In this embodiment, similarly to the first embodiment, the edge on the leading side of the top foil piece 11 in the rotational direction of the rotary shaft 1 is configured as a fixed edge 12 fixed to the base plate 30. The edge on the leading side of the vibration-damping foil piece 51 in the rotational direction of the rotary shaft 1 is configured as a fixed edge 51a fixed to the base plate 30. The fixed edge 51a of the vibration-damping foil piece 51 is fixed to the base plate 30 together with the fixed edge 12 of the top foil piece 11 which is disposed overlapping the vibration-damping foil piece 51.

In a thrust foil bearing structure (for example, a structure disclosed in Patent Document 2 described above) in the related art, the bearing clearance is narrowest at the edge on the trailing side of a top foil, and the clearance at this edge may become sub-micrometers when a high load is added thereto. Accordingly, the edge on the trailing side of the top foil may easily contact a thrust collar, and if the contact occurs therebetween, the top foil is worn and the bearing lifetime may deteriorate, and at the worst case, seizure of the bearing may occur. In order to prevent this situation, it is preferable to always set the edge on the trailing side of the top foil to be parallel to the thrust collar.

However, in a general thrust bearing, since the circumferential speed on the outer circumferential edge-side of the thrust collar is higher than that on the inner circumferential edge-side thereof, the pressure (the film pressure) of a fluid lubrication film is increased at the outer circumferential edge-side, and is decreased at the inner circumferential edge-side because the circumferential speed of the thrust collar is low thereon. Therefore, the outer circumferential edge-side of the top foil is pushed toward a bump foil and may move away from the thrust collar, and in contrast, the inner circumferential edge-side of the top foil rises up toward the thrust collar and thus may approach the thrust collar.

As a result, the film thickness of a fluid lubrication film on the inner circumferential edge-side of the top foil is significantly decreased at the edge on the trailing side of the top foil, and this part may not bear a high load. Therefore, in a thrust bearing in the related art, as shown in, for example, Patent Document 2, a bump foil is divided into a plurality of portions in the radial direction. That is, slits are provided between inner and outer circumferential sides (inner and outer sides in the radial direction) of the bump foil, whereby the bump foil is divided into four portions in total in the range from the inner circumferential side to the outer circumferential side of the bump foil, and the support force by the bump foil is smoothly changed from the inner circumferential side to the outer circumferential side thereof.

However, even if a thrust bearing is employed in which the bump foil is divided in this way, an effect of damping the vibration of a rotary shaft caused by the above-described vibration or impact may not be sufficient, and the rotary shaft and a stationary part (a housing) may contact each other. For example, in a case where the rotary machine is a turbo machine, the impeller may rub against the housing.

The operation of the thrust bearing 3B(3) of this embodiment is described compared to such a configuration in the related art.

The rotary shaft 1 (the thrust collar 4) rotates, the pressure of a fluid lubrication film is increased, and the top foil piece 11 is pushed toward the back foil piece 21. At this time, the circumferential speed on the outer circumferential side of the top foil piece 11 is high, and the pressure (the film pressure) of a fluid lubrication film thereat becomes high, and in contrast, the circumferential speed on the inner circumferential side of the top foil piece 11 is low, and the film pressure of a fluid lubrication film thereat becomes low.

Therefore, the outer circumferential part of the top foil piece 11 is pushed toward the back foil piece 21 and starts moving away from the thrust collar 4, and in contrast, the inner circumferential part of the top foil piece 11 starts rising toward the thrust collar 4.

However, in this embodiment, the back foil piece 21 is divided in four portions in the range between the inner and outer circumferential sides thereof, and the peak parts 23 of the back foil-divided portions 21b on the inner circumferential side of the back foil piece 21 are set to be less than those of the back foil-divided portions 21b on the outer circumferential side thereof. Therefore, the supporting force for the top foil piece 11 becomes high at the outer circumferential side thereof and becomes low at the inner circumferential side thereof, and thus can balance with the pressure of a fluid lubrication film (the pressure becomes high at the outer circumferential side and becomes low at the inner circumferential side). Accordingly, the inner and outer circumferential sides of the top foil piece 11 are approximately evenly pushed toward the back foil piece 21, the film thickness of a fluid lubrication film on the inner circumferential side of the top foil piece 11 can be prevented from being significantly decreased at the edge on the trailing side of the top foil piece 11, and even when a high load is added, a non-contact state between the top foil piece 11 and the thrust collar 4 is maintained.

Since the back foil piece 21 is divided in four (a plurality of) portions in the radial direction, a back foil-divided portion 21b on the inner circumferential side of the back foil piece 21 and another back foil-divided portion 21b on the outer circumferential side thereof independently move. Therefore, the deformation of the back foil piece 21 occurring when the top foil piece 11 is pushed toward the back foil piece 21 becomes smooth in the radial direction, and thus the support force by the back foil piece is also smoothly changed from the inner circumferential side to the outer circumferential side thereof. In addition, since the vibration-damping foil piece 51 is divided into four (a plurality of) portions in the radial direction, the vibration-damping foil-divided portions 51b independently move corresponding to the back foil-divided portions 21b, and thereby a vibration-damping foil-divided portion 51b follows the movement of each back foil-divided portion 21b without a resistance thereto.

In the thrust bearing 3B(3) of this embodiment, a vibration-damping foil piece 51 is disposed in each of the positions between back foil pieces 21 (bump foil pieces) and top foil pieces 11. Therefore, when the rotary shaft 1 receives vibration or impact in the axial direction (the thrust direction) thereof and the top foil piece 11 is pushed by the thrust collar 4 via a fluid lubrication film, sliding (friction) occurs between the top foil 10 and the back foil 20 (a bump foil) in the related art, whereas in the thrust bearing 3B(3), sliding (friction) occurs between the top foil piece 11 and the vibration-damping foil piece 51 and between the vibration-damping foil piece 51 and the back foil piece 21. Thus, the area in which friction damping occurs increases, thereby a higher friction damping effect can be obtained than that in the related art, and it is possible to appropriately absorb vibration and impact of the rotary shaft 1 in the thrust direction.

Each of the back foil piece 21 and the vibration-damping foil piece 51 is divided in the radial direction, and the deformation of the top foil piece 11 becomes smooth in the radial direction. Therefore, it is possible to prevent the top foil piece 11 from partially contacting the thrust collar 4, whereby it is possible to prevent the top foil piece 11 from being partially worn and to prevent deterioration of the bearing lifetime and occurrence of seizure.

The back foil piece 21 is formed by unifying the back foil-divided portions 21b through a continuous edge, and the vibration-damping foil piece 51 is formed by unifying the vibration-damping foil-divided portions 51b through a continuous edge. Therefore, the back foil piece 21 and the vibration-damping foil piece 51 can be easily fixed to the base plate 30 through spot-welding or the like.

The second slit 51c between the vibration-damping foil-divided portions 51b is formed to overlap the first slit 21c between the back foil-divided portions 21b. Therefore, each vibration-damping foil-divided portion 51b can appropriately follow the movement of a back foil-divided portion 21b to which the vibration-damping foil-divided portion 51b corresponds.

The edge on the leading side of the vibration-damping foil piece 51 in the rotational direction of the rotary shaft 1 is set to the fixed edge Ma, and the fixed edge Ma is fixed to the base plate 30 together with the fixed edge 12 of the top foil piece 11. Therefore, the top foil piece 11 is formed in the same shape as that in the related art without changing the shape of the top foil piece 11 from that in the related art, and thus it is possible to limit an increase of the cost. That is, in a case where the fixed edge 12 of the top foil piece 11 is directly attached to the base plate 30 without inserting the fixed edge 51a of the vibration-damping foil piece 51 into a position under the fixed edge 12 of the top foil piece 11, the height of the top foil piece 11 has to be increased by the thickness of the vibration-damping foil piece 51 compared to that in the related art. However, when the fixed edge 12 of the top foil piece 11 is fixed so as to overlap the fixed edge 51a of the vibration-damping foil piece 51, the above-described modifications in design can become unnecessary, and a new mold or the like does not have to be prepared.

The fixed edge 51a of the vibration-damping foil piece 51 is fixed to the base plate 30 together with the fixed edge 12 of the top foil piece 11. Therefore, the number of fixed points of foil pieces through spot-welding (welding at points) or the like can be set to the same number as that in the related art in which the vibration-damping foil piece 51 is not employed, and it is possible to limit an increase of the manufacturing cost.

In a case where the vibration-damping foil piece 51 is formed of vibration-damping alloy, a damping effect based on the deformation (the bending deformation) of the vibration-damping foil piece 51 is added to friction damping based on sliding between foils, and thus a high friction damping effect can be obtained.

The thin part 14 is provided in the top foil piece 11 in the vicinity on the trailing side of the fixed edge 12 in the rotational direction. Therefore, when a load is added to the top foil piece 11, the trailing side of the top foil piece 11 in the rotational direction can easily and smoothly incline, and thus the starting torque is reduced. In addition, after the rotary shaft 1 starts rotating, since the top foil piece 11 also easily and smoothly inclines, the optimum inclination angle is easily obtained, and the load capability is improved.

(Third Embodiment)

Figure 6A:
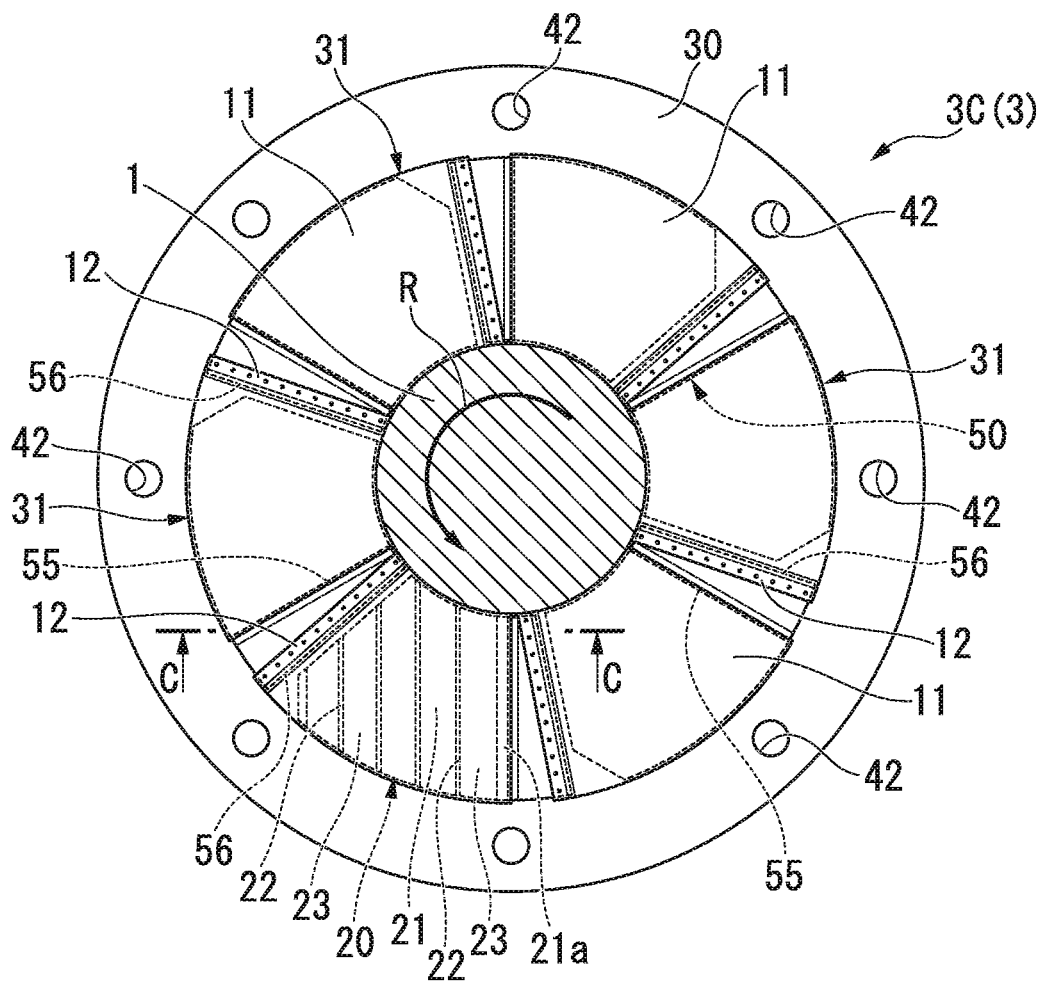
FIG. 6A is a plan view showing a third embodiment of the thrust bearing of the present disclosure.
Figure 6B:
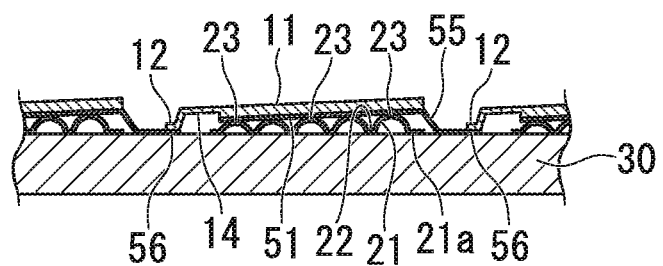
FIG. 6B is a cross-sectional view taken along C-C line in FIG. 6A.
Figure 6C:
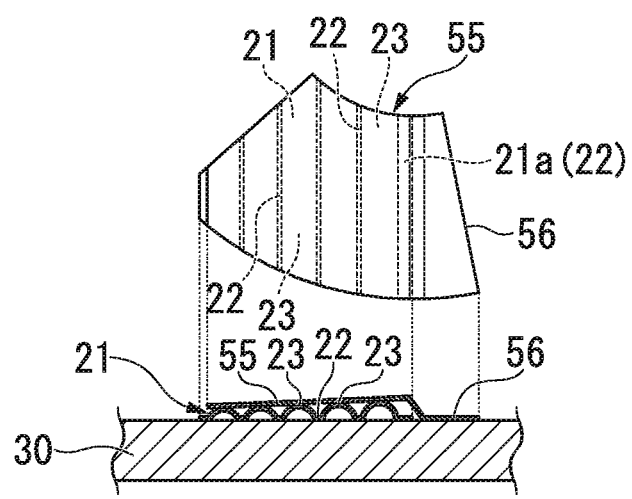
FIG. 6C is an explanatory view showing the shapes of a vibration-damping foil piece and a back foil piece of the third embodiment in which a plan view and a side view thereof correspond to each other.

Next, a third embodiment of the thrust bearing 3 of the present disclosure is described with reference to FIGS. 6A to 6C. FIG. 6A is a plan view of a thrust bearing. FIG. 6B is a cross-sectional view taken along C-C line in FIG. 6A. FIG. 6C is an explanatory view showing the shapes of a vibration-damping foil piece and a back foil piece in which a plan view and a side view thereof correspond to each other.

As shown in FIGS. 6A and 6C, a thrust bearing 3C(3) of the third embodiment mainly differs from the thrust bearing 3A(3) of the first embodiment in that the edge on the trailing side of a vibration-damping foil piece 55 configuring a vibration-damping foil 50 in the rotational direction of a rotary shaft 1 is configured as a fixed edge 56 and is fixed to a base plate 30 together with a fixed edge 12 of a top foil piece 11. In the description of this embodiment, components which are the same as those of the first embodiment are attached with the same reference signs as those of the first embodiment, and duplicate descriptions are omitted. Hereinafter, configurations different from the first embodiment are mainly described.

The vibration-damping foil piece 55 of this embodiment is formed so that the trailing side thereof in the rotational direction is longer than that of the vibration-damping foil piece 51 of the first embodiment shown in FIGS. 3A to 3C, and as shown in FIGS. 6A and 6B, an edge of the vibration-damping foil piece 55, namely the fixed edge 56, is fixed to the base plate 30 together with the fixed edge 12 of the top foil piece 11 positioned next to this vibration-damping foil piece 55 on the trailing side thereof in the rotational direction. In contrast, the leading side of the vibration-damping foil piece 55 in the rotational direction is a free end which is merely supported by the tops of peak parts 23 of a back foil piece 21 without being fixed thereto in this embodiment. In addition, as shown in FIG. 6C, a part on the leading side of the vibration-damping foil piece 55 in the rotational direction is removed similarly to the back foil piece 21 by being cut in the length direction of a valley part 22.

That is, the edge on the leading side of the top foil piece 11 of this embodiment in the rotational direction of the rotary shaft 1 is configured as the fixed edge 12 fixed to the base plate 30. The edge on the trailing side of the vibration-damping foil piece 55 in the rotational direction of the rotary shaft 1 is configured as the fixed edge 56 fixed to the base plate 30. The fixed edge 56 of a vibration-damping foil piece 55 is fixed to the base plate 30 together with the fixed edge 12 of a top foil piece 11 positioned next in the circumferential direction to another top foil piece 11 (on the trailing side thereof in the rotational direction) disposed overlapping this vibration-damping foil piece 55.

In the thrust bearing 3C(3) including the vibration-damping foil piece 55, a vibration-damping foil piece 55 is disposed in each of the positions between back foil pieces 21 (bump foil pieces) and top foil pieces 11. Therefore, when the rotary shaft 1 receives vibration or impact in the axial direction (the thrust direction) thereof and the top foil piece 11 is pushed by the thrust collar 4 via a fluid lubrication film, a higher friction damping effect can be obtained than that in the related art, and it is possible to appropriately absorb vibration and impact of the rotary shaft 1 in the thrust direction.

The edge on the trailing side of the vibration-damping foil piece 55 in the rotational direction of the rotary shaft 1 is configured as the fixed edge 56, and the fixed edge 56 is fixed to the base plate 30 together with the fixed edge 12 of the top foil piece 11 positioned next to this vibration-damping foil piece 55 on the trailing side thereof in the rotational direction. Therefore, similarly to the first embodiment, the top foil piece 11 is formed in the same shape as that in the related art without changing the shape of the top foil piece 11 from that in the related art, and thus it is possible to limit an increase of the cost.

The fixed edge 56 of the vibration-damping foil piece 55 is fixed to the base plate 30 together with the fixed edge 12 of the top foil piece 11. Therefore, the number of fixed points of foil pieces through spot-welding (welding at points) or the like can be set to be the same as that in the related art in which the vibration-damping foil piece 55 is not employed, and thus it is possible to limit an increase of the manufacturing cost.

The fixed edge 56 of the vibration-damping foil piece 55 is fixed to the base plate 30 together with the fixed edge 12 of the top foil piece 11 positioned next to the vibration-damping foil piece 55 on the trailing side thereof in the rotational direction. Therefore, when the top foil piece 11 is pushed by the thrust collar 4 via a fluid lubrication film, the top foil piece 11 and the vibration-damping foil piece 55 overlapped with each other in the up-and-down direction can slide on each other in directions in which the free end-sides thereof face each other, namely in opposite directions (directions toward the fixed edges thereof, opposite directions in the circumferential direction). In addition, in order to properly cause such sliding, a sufficient gap is formed between the end on the leading side of the vibration-damping foil piece 55 in the rotational direction and the fixed edge 12 of the top foil piece 11 overlapping the above end. Therefore, the amount of relative sliding between the top foil piece 11 and the vibration-damping foil piece 55 is increased, and thus a high friction damping effect is obtained.

(Fourth Embodiment)

Figure 7:
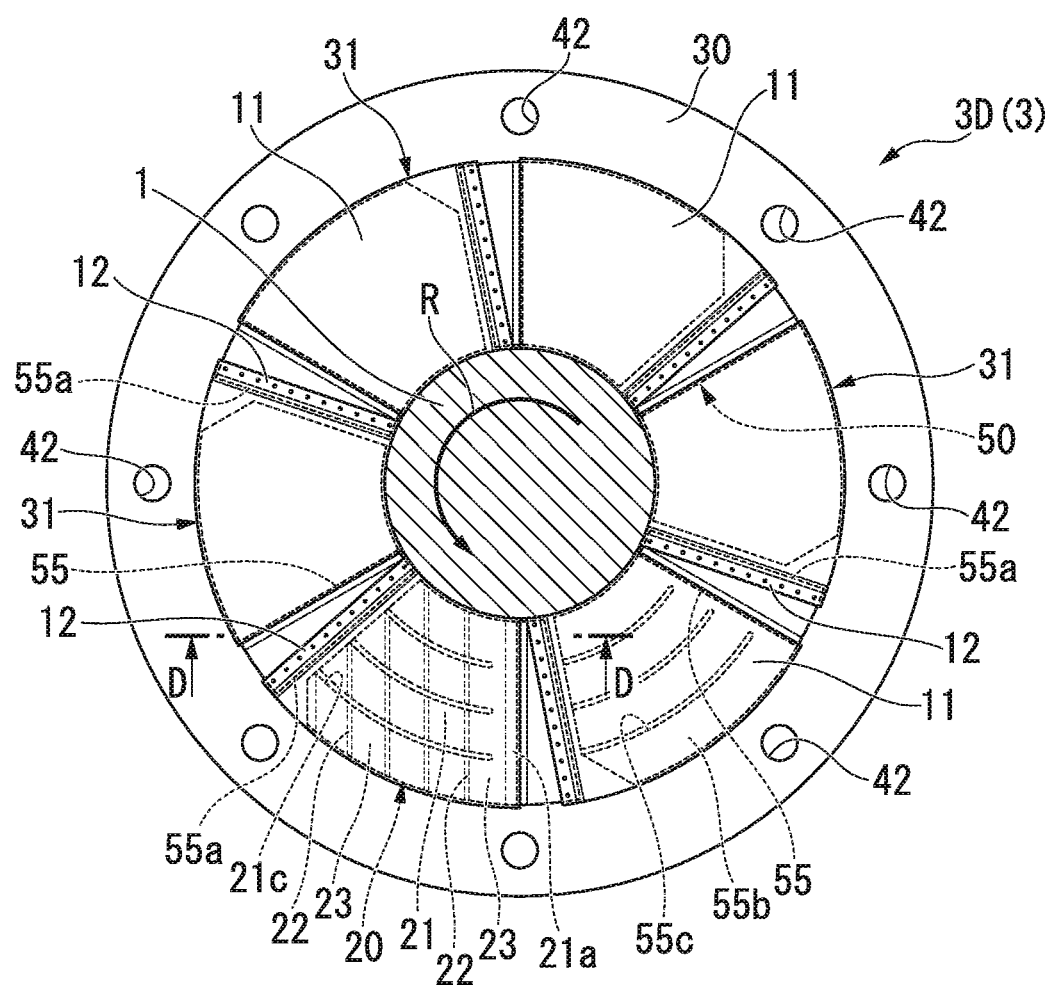
FIG. 7 is a plan view of a fourth embodiment of the thrust bearing of the present disclosure.
Figure 8A:
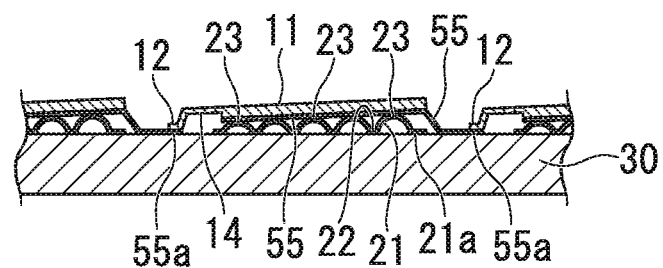
FIG. 8A is a cross-sectional view taken along D-D line in FIG. 7.
Figure 8B:
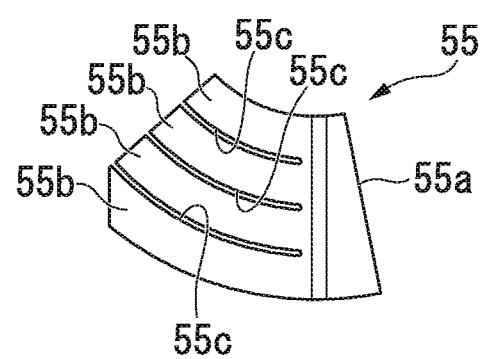
FIG. 8B is a plan view of a vibration-damping foil piece of the fourth embodiment.
Figure 8C:
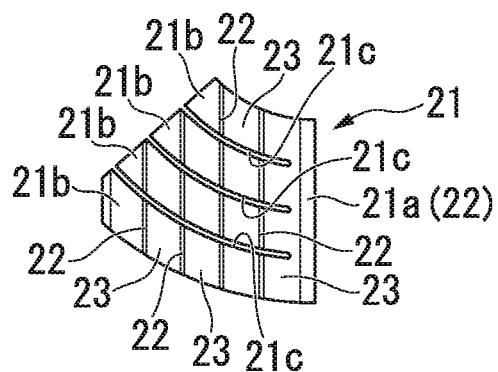
FIG. 8C is a plan view of a back foil piece of the fourth embodiment.
Figure 8D:
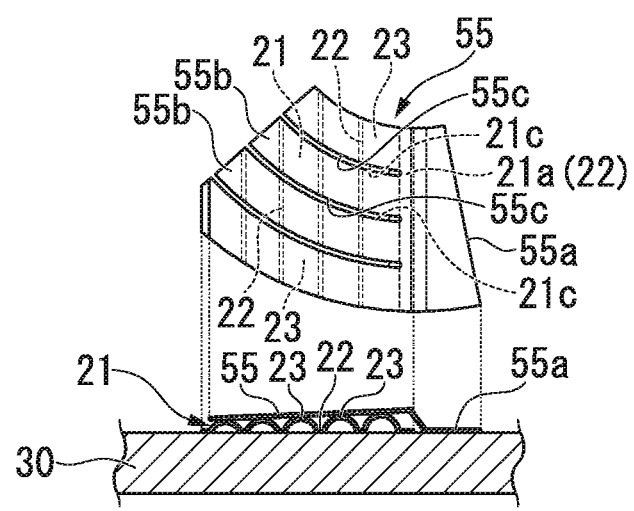
FIG. 8D is an explanatory view showing the shapes of the vibration-damping foil piece and the back foil piece of the fourth embodiment in which a plan view and a side view thereof correspond to each other.

Next, a fourth embodiment of the thrust bearing 3 of the present disclosure is described with reference to FIGS. 7, 8A to 8D. FIG. 7 is a plan view of a thrust bearing. FIG. 8A is a cross-sectional view taken along D-D line in FIG. 7. FIG. 8B is a plan view of a vibration-damping foil piece. FIG. 8C is a plan view of a back foil piece. FIG. 8D is an explanatory view showing the shapes of the vibration-damping foil piece and the back foil piece in which a plan view and a side view thereof correspond to each other.

As shown in FIGS. 8A and 8D, a thrust bearing 3D(3) of the fourth embodiment mainly differs from the thrust bearing 3B(3) of the second embodiment in that the edge on the trailing side of a vibration-damping foil piece 55 configuring a vibration-damping foil 50 in the rotational direction of a rotary shaft 1 is configured as a fixed edge 55a and is fixed to a base plate 30 together with a fixed edge 12 of a top foil piece 11. In the description of this embodiment, components which are the same as those of the second embodiment (and the first embodiment) are attached with the same reference signs as those of the second embodiment (and the first embodiment), and duplicate descriptions are omitted. Hereinafter, configurations different from the second embodiment are mainly described.

As shown in FIG. 8B, the leading side of the vibration-damping foil piece 55 of this embodiment in the rotational direction of the rotary shaft 1 is equally divided into four (a plurality of) portions in the radial direction, and the fixed edge 55a which is the other side (the trailing side in the rotational direction) of the vibration-damping foil piece 55 is a continuous edge extending in the radial direction. Since the opposite side of the vibration-damping foil piece 55 to the fixed edge 55a is divided into four portions in this way, the vibration-damping foil piece 55 is configured of four strip-shaped vibration-damping foil-divided portions 55b and the fixed edge 55a (a continuous edge).

A second slit 55c is formed between each pair of vibration-damping foil-divided portions 55b of the four strip-shaped vibration-damping foil-divided portions 55b. In this embodiment, each of the second slits 55c is formed in an arc shape forming part of the circumference of a circle coaxial with another circle formed of the outer circumferences of the vibration-damping foil pieces 55. As shown in FIG. 8D, the second slit 55c is formed and disposed so as to overlap a first slit 21c of a back foil piece 21.

The end (the end close to the fixed edge 55a) of the second slit 55c of this embodiment is positioned in the vicinity of the fixed edge 55a. In addition, the above end of the second slit 55c may be in contact with the fixed edge 55a.

When the length of the vibration-damping foil piece 55 in the circumferential direction is represented by a sign $L_{31}$, the length (the width) of the fixed edge 55a in the circumferential direction is represented by a sign $L_{32}$, and the length of the second slit 55c in the circumferential direction (namely, the length of the vibration-damping foil-divided portion 55b in the circumferential direction) is represented by a sign $L_{33}$, these lengths may satisfy the following formula (3).

$$\tfrac{2}{3}\times(L_{31}-L_{32})\le L_{33}\le 1\times(L_{31}-L_{32}) \qquad \text{Formula (3)}$$

The vibration-damping foil piece 55 is formed so that the trailing side thereof in the rotational direction is longer than that of the vibration-damping foil piece 51 of the second embodiment shown in FIGS. 4, 5A to 5D, and as shown in FIGS. 7 and 8A, an edge of the vibration-damping foil piece 55, namely the fixed edge 55a, is fixed to the base plate 30 together with the fixed edge 12 of the top foil piece 11 positioned next to the vibration-damping foil piece 55 on the trailing side thereof in the rotational direction. In contrast, the leading side of the vibration-damping foil piece 55 in the rotational direction is a free end which is merely supported by the tops of peak parts 23 of the back foil piece 21 without being fixed thereto in this embodiment.

That is, the edge on the leading side of the top foil piece 11 of this embodiment in the rotational direction of the rotary shaft 1 is configured as the fixed edge 12 fixed to the base plate 30. The edge on the trailing side of the vibration-damping foil piece 55 in the rotational direction of the rotary shaft 1 is configured as the fixed edge 55a fixed to the base plate 30. The fixed edge 55a of a vibration-damping foil piece 55 is fixed to the base plate 30 together with the fixed edge 12 of a top foil piece 11 positioned next in the circumferential direction to another top foil piece 11 (on the trailing side thereof in the rotational direction) disposed overlapping the vibration-damping foil piece 55.

In the thrust bearing 3D(3) including the vibration-damping foil piece 55, a vibration-damping foil piece 55 is disposed in each of the positions between back foil pieces 21 (bump foil pieces) and top foil pieces 11. Therefore, when the rotary shaft 1 receives vibration or impact in the axial direction (the thrust direction) thereof and the top foil piece 11 is pushed by the thrust collar 4 via a fluid lubrication film, a higher friction damping effect can be obtained than that in the related art, and it is possible to appropriately absorb vibration and impact of the rotary shaft 1 in the thrust direction.

Each of the back foil piece 21 and the vibration-damping foil piece 55 is divided in the radial direction, and the deformation of the top foil piece 11 becomes smooth in the radial direction. Therefore, it is possible to prevent the top foil piece 11 from partially contacting the thrust collar 4, whereby it is possible to prevent the top foil piece 11 from being partially worn and to prevent deterioration of the bearing lifetime and occurrence of seizure.

The edge on the trailing side of the vibration-damping foil piece 55 in the rotational direction of the rotary shaft 1 is configured as the fixed edge 55a, and the fixed edge 55a is fixed to the base plate 30 together with the fixed edge 12 of the top foil piece 11 positioned next to the vibration-damping foil piece 55 on the trailing side thereof in the rotational direction. Therefore, similarly to the first embodiment, the top foil piece 11 is formed in the same shape as that in the related art without changing the shape of the top foil piece 11 from that in the related art, and thus it is possible to limit an increase of the cost.

The fixed edge 55a of the vibration-damping foil piece 55 is fixed to the base plate 30 together with the fixed edge 12 of the top foil piece 11. Therefore, the number of fixed points of foil pieces through spot-welding (welding at points) or the like can be set to be the same as that in the related art in which the vibration-damping foil piece 55 is not employed, and thus it is possible to limit an increase of the manufacturing cost. The fixed edge 55a of the vibration-damping foil piece 55 is fixed to the base plate 30 together with the fixed edge 12 of the top foil piece 11 positioned next to the vibration-damping foil piece 55 on the trailing side thereof in the rotational direction. Therefore, when the top foil piece 11 is pushed by the thrust collar 4 via a fluid lubrication film, the top foil piece 11 and the vibration-damping foil piece 55 overlapped with each other in the up-and-down direction can slide on each other in directions in which the free end-sides thereof face each other, namely in opposite directions (directions toward the fixed edges thereof). In addition, in order to properly cause such sliding, a sufficient gap is formed between the end on the leading side of the vibration-damping foil piece 55 in the rotational direction and the fixed edge 12 of the top foil piece 11 overlapping the above end. Therefore, the amount of relative sliding between the top foil piece 11 and the vibration-damping foil piece 55 is increased, and thus a high friction damping effect is obtained.

(Fifth Embodiment)

Figure 9A:
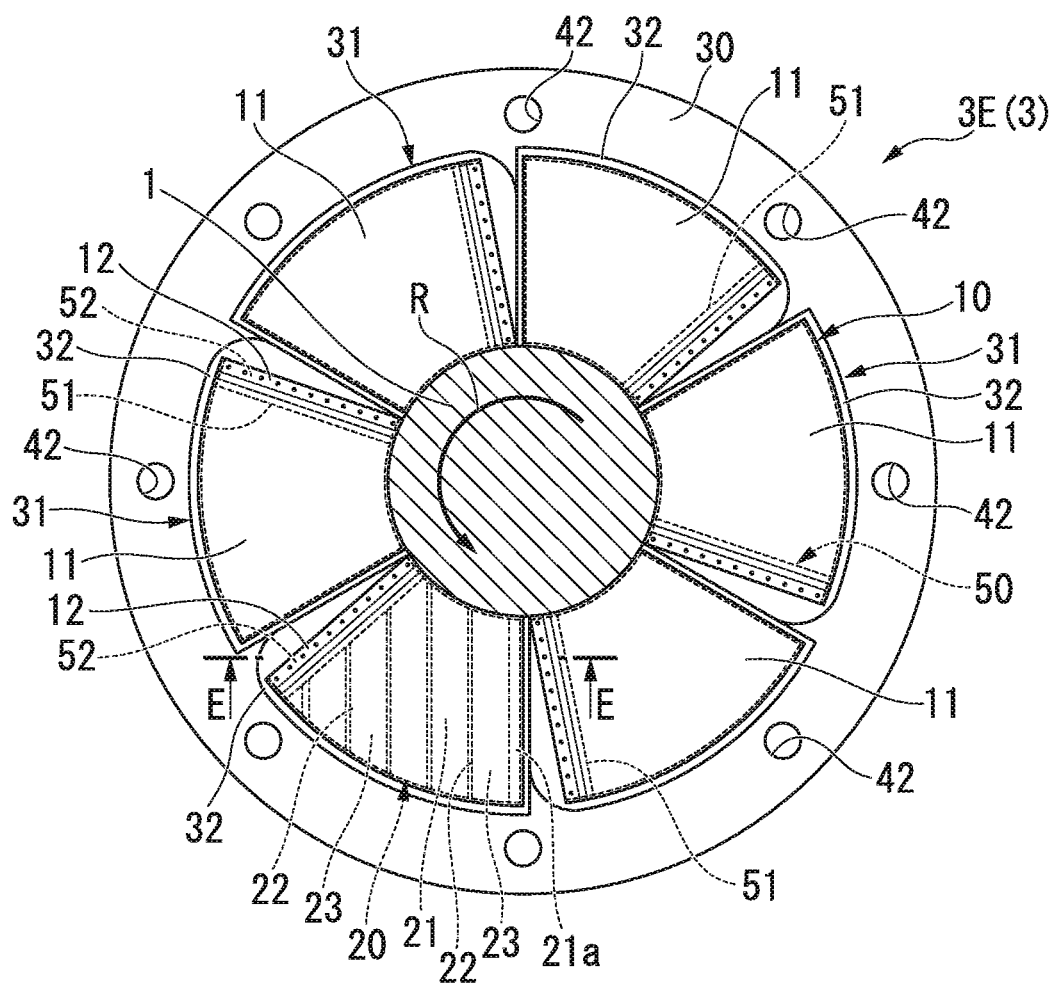
FIG. 9A is a plan view showing a fifth embodiment of the thrust bearing of the present disclosure.
Figure 9B:
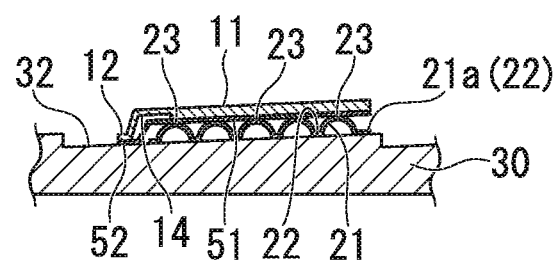
FIG. 9B is a cross-sectional view taken along E-E line in FIG. 9A.
Figure 9C:
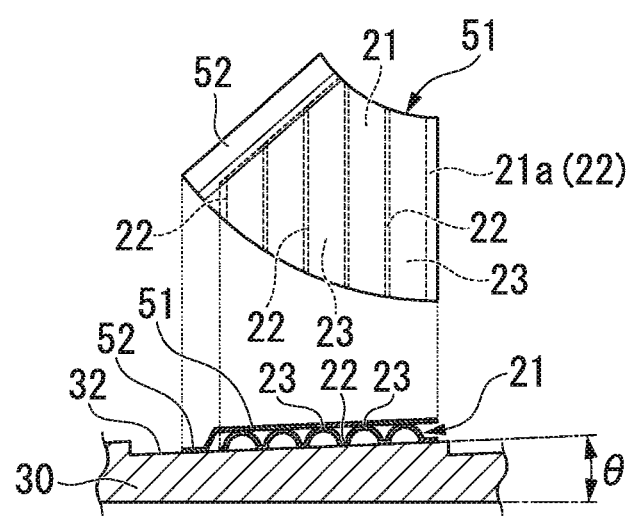
FIG. 9C is an explanatory view showing the shapes of a vibration-damping foil piece and a back foil piece of the fifth embodiment in which a plan view and a side view thereof correspond to each other.

Next, a fifth embodiment of the thrust bearing 3 of the present disclosure is described with reference to FIGS. 9A to 9C. FIG. 9A is a plan view of a thrust bearing. FIG. 9B is a cross-sectional view taken along E-E line in FIG. 9A. FIG. 9C is an explanatory view showing the shapes of a vibration-damping foil piece and a back foil piece in which a plan view and a side view thereof correspond to each other.

As shown in FIGS. 9A and 9C, a thrust bearing 3E(3) of the fifth embodiment mainly differs from the thrust bearing 3A(3) of the first embodiment in that a support area 31 of a base plate 30 is provided with an inclined surface 32, and the heights of all peak parts 23 of a back foil piece 21 are set to be the same. In the description of this embodiment, components which are the same as those of the first embodiment are attached with the same reference signs as those of the first embodiment, and duplicate descriptions are omitted. Hereinafter, configurations different from the first embodiment are mainly described.

In this embodiment, as shown in FIG. 9A, an area within the support area 31 supports the back foil piece 21, a vibration-damping foil piece 51 and a top foil piece 11, and the above entire area is configured as the inclined surface 32 whose height gradually increases from a fixed edge 12 of the top foil piece 11 toward the edge on the trailing side thereof. In other words, the support area 31 of the base plate 30 supporting the back foil piece 21 is provided with the inclined surface 32 whose height (height in the axial direction of the rotary shaft 1) gradually increases from the end on the leading side toward the end on the trailing side of the inclined surface 32 in the rotational direction of the rotary shaft 1. That is, as shown in FIG. 9B, the inclined surface 32 is formed to be inclined in a direction orthogonal to a fixed edge 21a of the back foil piece 21.

Similarly to the first embodiment, the back foil piece 21 is formed in a wave sheet shape in which valley parts 22 contacting the base plate 30 and the peak parts 23 contacting the top foil piece 11 (the vibration-damping foil piece 51) are alternately disposed. It is noted that in this embodiment, as shown in FIGS. 9B and 9C, the heights of all the peak parts 23 are set to be the same.

Similarly to the first embodiment, the valley parts 22 and the peak parts 23 are arranged in a direction orthogonal to the fixed edge 21a of the back foil piece 21. Therefore, the height of the peak parts 23 of the back foil piece 21 increases at a constant rate in the inclination direction of the inclined surface 32 of the base plate 30, namely toward the trailing side of the inclined surface 32 in the rotational direction of the rotary shaft 1. That is, the height of the peak parts 23 is apparently the same as that of the first embodiment. Thus, the inclination angle θ of the top foil piece 11 disposed on the back foil piece 21 is set to be equivalent to that of the first embodiment. In this embodiment, as shown in FIG. 9C, the inclination angle θ of the top foil piece 11 is determined by the inclination angle θ of the inclined surface 32.

In the thrust bearing 3E(3) of this embodiment, a vibration-damping foil piece 51 is disposed in each of the positions between back foil pieces 21 (bump foil pieces) and top foil pieces 11. Therefore, when the rotary shaft 1 receives vibration or impact in the axial direction (the thrust direction) thereof and the top foil piece 11 is pushed by the thrust collar 4 via a fluid lubrication film, a higher friction damping effect can be obtained than that in the related art, and it is possible to appropriately absorb vibration and impact of the rotary shaft 1 in the thrust direction.

Each support area 31 of the base plate 30 is provided with the inclined surface 32, the heights of the peak parts 23 of the back foil piece 21 are set to be the same, and the arrangement direction of the peak parts 23 is set to be the same as the inclination direction of the inclined surface 32. Therefore, when the top foil piece 11 is disposed on the inclined surface 32 via the back foil piece 21 and the vibration-damping foil piece 51, the height of the top foil piece 11 can be accurately changed along the inclined surface 32. That is, a predetermined inclination angle θ is applied to the top foil piece 11. At this time, it is sufficient that the back foil piece 21 is manufactured so that the peak parts 23 have a constant height without changing the height thereof, and thus the machining cost can be reduced. Thus, according to the thrust bearing 3E(3), the mass productivity can be improved by simplifying the machining, and the cost can be reduced. In addition, since the machining is simplified and thus the variation of product is decreased, an expected bearing performance (for example, the bearing load capability) at the time of design can be easily obtained.

(Sixth Embodiment)

Figure 10A:
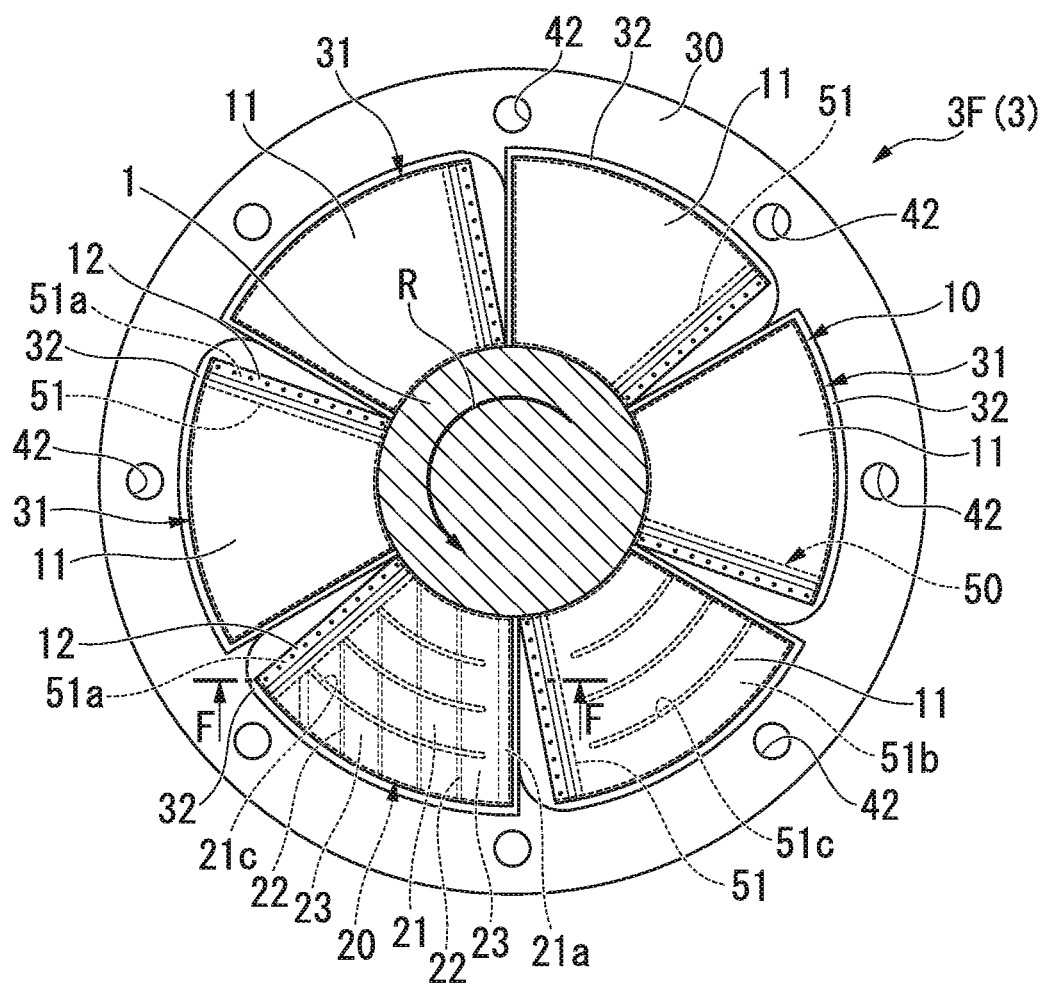
FIG. 10A is a plan view showing a sixth embodiment of the thrust bearing of the present disclosure.
Figure 10B:
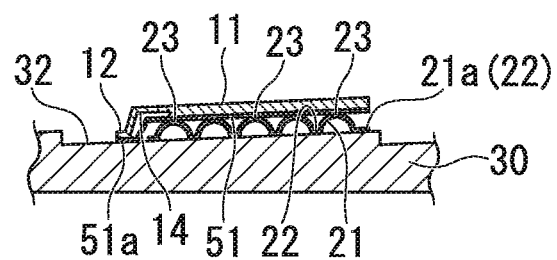
FIG. 10B is a cross-sectional view taken along F-F line in FIG. 10A.
Figure 10C:
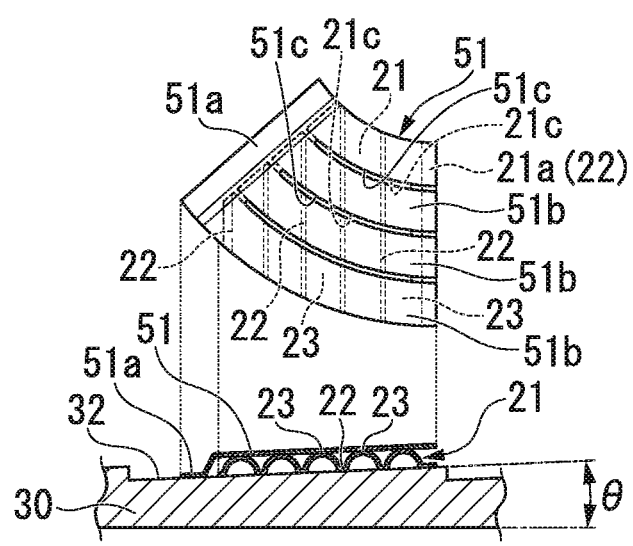
FIG. 10C is an explanatory view showing the shapes of a vibration-damping foil piece and a back foil piece of the sixth embodiment in which a plan view and a side view thereof correspond to each other.

Next, a sixth embodiment of the thrust bearing 3 of the present disclosure is described with reference to FIGS. 10A to 10C. FIG. 10A is a plan view of a thrust bearing. FIG. 10B is a cross-sectional view taken along F-F line in FIG. 10A. FIG. 10C is an explanatory view showing the shapes of a vibration-damping foil piece and a back foil piece in which a plan view and a side view thereof correspond to each other.

As shown in FIGS. 10A and 10C, a thrust bearing 3F(3) of the sixth embodiment mainly differs from the thrust bearing 3B(3) of the second embodiment in that a support area 31 of a base plate 30 is provided with an inclined surface 32, and the heights of all peak parts 23 of a back foil piece 21 are set to be the same. In the description of this embodiment, components which are the same as those of the second embodiment (and the first embodiment) are attached with the same reference signs as those of the second embodiment (and the first embodiment), and duplicate descriptions are omitted. Hereinafter, configurations different from the second embodiment are mainly described.

In this embodiment, as shown in FIG. 10A, an area within the support area 31 supports the back foil piece 21, a vibration-damping foil piece 51 and a top foil piece 11, and the above entire area is configured as the inclined surface 32 whose height gradually increases from a fixed edge 12 of the top foil piece 11 toward the edge on the trailing side thereof. In other words, the support area 31 of the base plate 30 supporting the back foil piece 21 is provided with the inclined surface 32 whose height (height in the axial direction of the rotary shaft 1) gradually increases from the end on the leading side toward the end on the trailing side of the inclined surface 32 in the rotational direction of the rotary shaft 1. That is, as shown in FIG. 10B, the inclined surface 32 is formed to be inclined in a direction orthogonal to a fixed edge 21a of the back foil piece 21.

Similarly to the second embodiment, the back foil piece 21 is formed in a wave sheet shape in which valley parts 22 contacting the base plate 30 and the peak parts 23 contacting the top foil piece 11 (the vibration-damping foil piece 51) are alternately disposed. It is noted that in this embodiment, as shown in FIGS. 10B and 10C, the heights of all the peak parts 23 are set to be the same only in the circumferential direction of the base plate 30. In addition, this embodiment is equivalent to the second embodiment in that when peak parts 23 arranged in a row are compared to each other, the peak parts 23 of two back foil-divided portions 21b positioned on the outer circumferential side of the back foil piece 21 are formed so that the heights of the tops thereof are slightly greater than those of the peak parts 23 of two back foil-divided portions 21b positioned on the inner circumferential side of the back foil piece 21.

Similarly to the second embodiment, the valley parts 22 and the peak parts 23 are arranged in a direction orthogonal to the fixed edge 21a of the back foil piece 21. Therefore, the height of the peak parts 23 of the back foil piece 21 increases at a constant rate in the inclination direction of the inclined surface 32 of the base plate 30, namely toward the trailing side of the inclined surface 32 in the rotational direction of the rotary shaft 1. That is, the height of the peak parts 23 is apparently the same as that of the second embodiment. Thus, the inclination angle θ of the top foil piece 11 disposed on the back foil piece 21 is set to be equivalent to that of the second embodiment. In this embodiment, as shown in FIG. 10C, the inclination angle θ of the top foil piece 11 is determined by the inclination angle θ of the inclined surface 32.

In the thrust bearing 3F(3) of this embodiment, a vibration-damping foil piece 51 is disposed in each of the positions between back foil pieces 21 (bump foil pieces) and top foil pieces 11. Therefore, when the rotary shaft 1 receives vibration or impact in the axial direction (the thrust direction) thereof and the top foil piece 11 is pushed by the thrust collar 4 via a fluid lubrication film, a higher friction damping effect can be obtained than that in the related art, and it is possible to appropriately absorb vibration and impact of the rotary shaft 1 in the thrust direction.

Each of the back foil piece 21 and the vibration-damping foil piece 51 is divided in the radial direction, and the deformation of the top foil piece 11 becomes smooth in the radial direction. Therefore, it is possible to prevent the top foil piece 11 from partially contacting the thrust collar 4, whereby it is possible to prevent the top foil piece 11 from being partially worn and to prevent deterioration of the bearing lifetime and occurrence of seizure.

Each support area 31 of the base plate 30 is provided with the inclined surface 32, the heights of the peak parts 23 of the back foil piece 21 are set to be the same, and the arrangement direction of the peak parts 23 is set to be the same as the inclination direction of the inclined surface 32. Therefore, when the top foil piece 11 is disposed on the inclined surface 32 via the back foil piece 21 and the vibration-damping foil piece 51, the height of the top foil piece 11 can be accurately changed along the inclined surface 32. That is, a predetermined inclination angle θ is applied to the top foil piece 11. At this time, it is sufficient that the back foil piece 21 is manufactured so that the peak parts 23 have a constant height in the circumferential direction without changing the height thereof in the circumferential direction, and thus the machining cost can be reduced. Thus, according to the thrust bearing 3F(3), the mass productivity can be improved by simplifying the machining, and the cost can be reduced. In addition, since the machining is simplified and thus the variation of product is decreased, an expected bearing performance (for example, the bearing load capability) at the time of design can be easily obtained.

According to the first aspect, a vibration-damping foil piece is disposed in each of positions between the back foil pieces and the top foil pieces. Therefore, when the rotary shaft receives vibration or impact in the axial direction (the thrust direction) thereof and the top foil piece is pushed by the thrust collar via a fluid lubrication film, sliding (friction) occurs between a top foil and a back foil (a bump foil) in the related art, whereas in this thrust bearing, sliding (friction) occurs between the top foil piece and the vibration-damping foil piece and between the vibration-damping foil piece and the back foil piece. Thus, the area in which friction damping occurs increases, thereby a higher friction damping effect can be obtained than that in the related art, and it is possible to appropriately absorb vibration and impact of the rotary shaft in the thrust direction.

According to the second aspect, since the back foil piece is divided into a plurality of portions in the radial direction, a divided portion on the inner circumferential side (the inner side in the radial direction) and another divided portion on the outer circumferential side (the outer side in the radial direction) of the back foil piece can move independently from each other. Therefore, the deformation of the back foil piece, which occurs when the top foil piece is pushed toward the back foil piece, becomes smooth in the radial direction, and thus the support force by the back foil piece also smoothly changes from the inner circumferential side toward the outer circumferential side thereof.

In addition, since the vibration-damping foil piece is also divided into a plurality of portions in the radial direction, the divided portions of the vibration-damping foil piece independently move corresponding to the divided portions of the back foil piece, and thereby follow the individual movements of the divided portions of the back foil piece without a resistance thereto. Thus, since each of the back foil piece and the vibration-damping foil piece is divided in the radial direction, the deformation of the top foil piece becomes smooth in the radial direction.

According to the third aspect, the divided portions of the back foil piece are unified through a continuous edge, and the divided portions of the vibration-damping foil piece are unified through a continuous edge. Therefore, fixing of the back foil piece and the vibration-damping foil piece onto the base plate is simplified.

According to the fourth aspect, since the second slit between the vibration-damping foil-divided portions is formed so as to overlap the first slit between the back foil-divided portions, each vibration-damping foil-divided portion further appropriately follows the individual movement of a back foil-divided portion to which the vibration-damping foil-divided portion corresponds.

According to the fifth aspect, the top foil piece can be formed in the same shape as that in the related art without changing the shape of the top foil piece from that in the related art. In addition, since the continuous edge of the vibration-damping foil piece is fixed to the base plate together with the top foil-fixed edge, the number of fixed points of foil pieces through spot-welding or the like can become the same as that in the related art, and it is possible to limit an increase of the manufacturing cost.

According to the sixth aspect, the continuous edge on the trailing side of the vibration-damping foil piece is fixed to the base plate together with the top foil-fixed edge. Therefore, when the top foil piece is pushed by the thrust collar via a fluid lubrication film, the top foil piece and the vibration-damping foil piece can slide on each other in directions in which the top foil piece and the vibration-damping foil piece face each other, namely in opposite directions (opposite directions in the circumferential direction). Thus, the amount of relative sliding between the top foil piece and the vibration-damping foil piece increases, and a further high friction damping effect is obtained.

According to the seventh aspect, the top foil piece can be formed in the same shape as that in the related art without changing the shape of the top foil piece from that in the related art. In addition, since the edge of the vibration-damping foil piece is fixed to the base plate together with the top foil-fixed edge, the number of fixed points of foil pieces through spot-welding or the like can be the same as that in the related art, and it is possible to limit an increase of the manufacturing cost.

According to the eighth aspect, the edge on the trailing side of the vibration-damping foil piece is fixed to the base plate together with the top foil-fixed edge. Therefore, when the top foil piece is pushed by the thrust collar via a fluid lubrication film, the top foil piece and the vibration-damping foil piece can slide on each other in directions in which the top foil piece and the vibration-damping foil piece face each other, namely in opposite directions (opposite directions in the circumferential direction). Thus, the amount of relative sliding between the top foil piece and the vibration-damping foil piece increases, and a further high friction damping effect is obtained.

According to the ninth aspect, the damping effect based on bending deformation of the vibration-damping foil piece formed of vibration-damping alloy is added to the friction damping based on sliding between foils, and thus a further high friction damping effect is obtained.

According to the tenth aspect, the trailing side of the top foil piece in the rotational direction of the rotary shaft can easily and smoothly incline. Thus, for example, in a case where the thrust collar is sandwiched between the top foils of a pair of thrust bearings, the starting torque of the rotary shaft decreases. In addition, after the rotary shaft starts rotating, since the top foil piece easily and smoothly inclines, the optimum inclination angle thereof is easily obtained, and the load capability improves.

According to the eleventh aspect, the bump foil piece can resiliently support the top foil piece. In addition, the edge on the trailing side of the bump foil piece in the rotational direction of the rotary shaft is set to be the bump foil-fixed edge fixed to the base plate. Therefore, the trailing side of the top foil piece in the rotational direction of the rotary shaft can be supported with a high rigidity in order to increase the pressure of a fluid lubrication film generated at the top foil piece at the small side of the bearing clearance, namely at the trailing side of the bearing clearance in the rotational direction, and thereby the load capability can be improved.

According to the twelfth aspect, the top foil piece is disposed on the inclined surface via the back foil piece (and the vibration-damping foil piece), whereby the height of the top foil piece can be accurately changed along the inclined surface. In addition, at this time, it is sufficient that the back foil piece is manufactured to have a constant height without changing the height thereof, and thus the machining cost can be limited.

According to the thirteenth aspect, the bump foil piece can resiliently support the top foil piece.

Hereinbefore, although embodiments of the present disclosure are described with reference to the attached drawings, the present disclosure is not limited to the above embodiments. The shape, the combination or the like of each component shown in the above embodiments is an example, and additions, omissions, replacements, and other modifications of a configuration based on a design request or the like can be adopted within the scope of the present disclosure.

For example, in the above embodiments, the back foil 20, the vibration-damping foil 50 and the top foil 10 are formed of six back foil pieces 21 (bump foil pieces), six vibration-damping foil pieces 51 (55) and six top foil pieces 11, respectively, and thus six support areas 31 are provided (set) in the base plate 30 in order to correspond thereto. However, the number of the back foil pieces 21 (bump foil pieces), the vibration-damping foil pieces 51 (55) or the top foil pieces 11 may be 5 or less, or 7 or more as long as the number is a number greater than one. In this case, the number of the support areas 31 is also changed to be the same as that of the back foil pieces 21 (bump foil pieces), the vibration-damping foil pieces 51 (55) or the top foil pieces 11.

In the above embodiments, one vibration-damping foil piece 51 is disposed between the back foil piece 21 (a bump foil piece) and the top foil piece 11. However, a plurality (for example, two or three) of vibration-damping foil pieces 51 may be disposed overlapping each other. If a plurality of vibration-damping foil pieces 51 are disposed overlapping each other in this way, the friction damping occurs based on sliding between the vibration-damping foil pieces 51, and thus a high friction damping effect can be obtained.

In the fifth and sixth embodiments, the support areas 31 of the base plates 30 of the first and second embodiments, respectively, are provided with the inclined surfaces 32, and thus the heights of the peak parts 23 of the back foil pieces 21 of the first, second, fifth and sixth embodiments are equivalent to each other. However, other embodiments may be adopted in which the support areas 31 of the base plates 30 of the third and fourth embodiments are provided with the inclined surfaces 32, and thus the heights of the peak parts 23 of the back foil pieces 21 of all the embodiments may be set to be equivalent to each other.

In the second, fourth or sixth embodiment, the back foil piece 21 (a bump foil piece) is formed of four back foil-divided portions 21b and a continuous edge (a fixed edge), and the vibration-damping foil piece 51 (the vibration-damping foil piece 55) is formed of four vibration-damping foil-divided portions 51b (four vibration-damping foil-divided portions 55b) and a continuous edge (a fixed edge). However, the number of divided portions is not limited to four, and the number may be any number which is two or more. In addition, the continuous edge need not be always formed, and thus the divided portions need not be connected to each other and may be formed in completely individual shapes.

In the second, fourth or sixth embodiment, the first slit 21c is formed in an arc shape by dividing the back foil piece 21 (a bump foil piece) into a plurality of portions in the radial direction, and the second slit 51c (the second slit 55c) is formed in an arc shape by dividing the vibration-damping foil piece 51 (the vibration-damping foil piece 55) into a plurality of portions in the radial direction. However, these slits may be formed in linear shapes.

In the above embodiments, the fixed edge 52 (51a, 55a, 56) of the vibration-damping foil piece 51 (55) and the fixed edge 12 of the top foil piece 11 are overlapped with each other in the up-and-down direction and are fixed together to the base plate 30 through spot-welding or the like. However, these fixed edges may be individually fixed to the base plate 30 in a state of being shifted away from each other without overlapping each other.

In addition, various configurations other than the above embodiments can be adopted with respect to the shape of the top foil piece, the vibration-damping foil piece or the bump foil piece, the arrangement of the top foil piece, the vibration-damping foil piece or the bump foil piece on the support area, the inclination direction of the inclined surface, or the like.

INDUSTRIAL APPLICABILITY

The present disclosure can be used for a thrust bearing which is disposed facing a thrust collar provided on a rotary shaft.

The invention claimed is:
1. A thrust bearing disposed so as to face a thrust collar provided on a rotary shaft, the thrust bearing comprising:
   a top foil disposed so as to face the thrust collar;
   a back foil disposed on a side of the top foil opposite to another side of the top foil facing the thrust collar; and
   an annular plate-shaped base plate disposed on a side of the back foil opposite to the top foil, the base plate supporting the back foil;
   wherein the back foil is formed of a plurality of back foil pieces arranged in a circumferential direction of the base plate,
   wherein the top foil is formed of a plurality of top foil pieces disposed on the back foil pieces, and
   wherein a vibration-damping foil piece is disposed in each position between the back foil pieces and the top foil pieces.
2. The thrust bearing according to claim 1,
   wherein at least one side of each back foil piece in the circumferential direction is divided into a plurality of portions in a radial direction thereof, and
   wherein at least one side of the vibration-damping foil piece in the circumferential direction is divided into a plurality of portions in the radial direction.
3. The thrust bearing according to claim 2,
   wherein the one side of the back foil piece in the circumferential direction is divided into the plurality of portions in the radial direction, and another side of the back foil piece in the circumferential direction is a continuous edge extending in the radial direction, and
   wherein the one side of the vibration-damping foil piece in the circumferential direction is divided into the plurality of portions in the radial direction, and another side of the vibration-damping foil piece in the circumferential direction is a continuous edge extending in the radial direction.

4. The thrust bearing according to claim 3,
wherein the back foil piece is provided with a first slit between a plurality of back foil-divided portions divided in the radial direction, and
wherein the vibration-damping foil piece is provided with a second slit between a plurality of vibration-damping foil-divided portions divided in the radial direction, the second slit overlapping the first slit.

5. The thrust bearing according to claim 4,
wherein an edge on a leading side of each top foil piece in a rotational direction of the rotary shaft is a top foil-fixed edge fixed to the base plate, and
wherein an edge on a leading side of the vibration-damping foil piece in the rotational direction of the rotary shaft is the continuous edge, and the continuous edge is fixed to the base plate together with the top foil-fixed edge of the top foil piece.

6. The thrust bearing according to claim 4,
wherein an edge on a leading side of each top foil piece in a rotational direction of the rotary shaft is a top foil-fixed edge fixed to the base plate, and
wherein an edge on a trailing side of the vibration-damping foil piece in the rotational direction of the rotary shaft is the continuous edge, and the continuous edge is fixed to the base plate together with the top foil-fixed edge of the top foil piece.

7. The thrust bearing according to claim 3,
wherein an edge on a leading side of each top foil piece in a rotational direction of the rotary shaft is a top foil-fixed edge fixed to the base plate, and
wherein an edge on a leading side of the vibration-damping foil piece in the rotational direction of the rotary shaft is the continuous edge, and the continuous edge is fixed to the base plate together with the top foil-fixed edge of the top foil piece.

8. The thrust bearing according to claim 3,
wherein an edge on a leading side of each top foil piece in a rotational direction of the rotary shaft is a top foil-fixed edge fixed to the base plate, and
wherein an edge on a trailing side of the vibration-damping foil piece in the rotational direction of the rotary shaft is the continuous edge, and the continuous edge is fixed to the base plate together with the top foil-fixed edge of the top foil piece.

9. The thrust bearing according to claim 1,
wherein an edge on a leading side of each top foil piece in a rotational direction of the rotary shaft is a top foil-fixed edge fixed to the base plate, and
wherein an edge on a leading side of the vibration-damping foil piece in the rotational direction of the rotary shaft is fixed to the base plate together with the top foil-fixed edge of the top foil piece.

10. The thrust bearing according to claim 1,
wherein an edge on a leading side of each top foil piece in a rotational direction of the rotary shaft is a top foil-fixed edge fixed to the base plate, and
wherein an edge on a trailing side of the vibration-damping foil piece in the rotational direction of the rotary shaft is fixed to the base plate together with the top foil-fixed edge of the top foil piece.

11. The thrust bearing according to claim 1,
wherein the vibration-damping foil piece is formed of vibration-damping alloy.

12. The thrust bearing according to claim 1,
wherein an edge on a leading side of each top foil piece in a rotational direction of the rotary shaft is a top foil-fixed edge fixed to the base plate, and
wherein the top foil piece includes a thin part in the vicinity on a trailing side of the top foil-fixed edge in the rotational direction of the rotary shaft, the thin part being formed to be thinner than another part of the top foil piece.

13. The thrust bearing according to claim 1,
wherein each back foil piece is formed of a wave sheet-shaped bump foil piece in which peak parts and valley parts are alternately formed, an edge on a trailing side of the bump foil piece in a rotational direction of the rotary shaft is a bump foil-fixed edge fixed to the base plate, and the back foil piece is disposed so that an arrangement direction of the peak parts is non-parallel to the bump foil-fixed edge, and
wherein the peak parts are formed so that the height of the peak parts gradually increases from a leading side toward a trailing side of the back foil piece in the rotational direction of the rotary shaft.

14. The thrust bearing according to claim 1,
wherein support areas of the base plate support the back foil pieces, and each of the support areas is provided with an inclined surface whose height gradually increases from an edge on a leading side toward another edge on a trailing side of the inclined surface in a rotational direction of the rotary shaft.

15. The thrust bearing according to claim 14,
wherein each back foil piece is formed of a wave sheet-shaped bump foil piece in which peak parts and valley parts are alternately formed, and is disposed so that an arrangement direction of the peak parts is the same as an inclination direction of the inclined surface.

16. The thrust bearing according to claim 1,
wherein the vibration-damping foil piece is disposed such that a separation between the vibration-damping foil piece and the base plate gradually increases from a leading side to a trailing side of the vibration-damping foil piece in a rotational direction of the rotary shaft.

* * * * *